United States Patent
Itoh et al.

(10) Patent No.: US 11,406,893 B2
(45) Date of Patent: *Aug. 9, 2022

(54) GAME CONTROL METHOD, SERVER APPARATUS, AND STORAGE MEDIUM

(71) Applicant: GREE, Inc., Tokyo (JP)

(72) Inventors: Takayuki Itoh, Tokyo (JP); Tomohiro Tsukihara, Tokyo (JP); Haruya Nishikubo, Tokyo (JP); Midori Moriyama, Tokyo (JP)

(73) Assignee: GREE, Inc., Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 17/070,421

(22) Filed: Oct. 14, 2020

(65) Prior Publication Data

US 2021/0023446 A1    Jan. 28, 2021

Related U.S. Application Data

(60) Continuation of application No. 14/454,329, filed on Aug. 7, 2014, now Pat. No. 10,835,817, which is a
(Continued)

(30) Foreign Application Priority Data

Dec. 7, 2012  (JP) ................................. 2012-268225
Apr. 9, 2013  (JP) ................................. 2013-081240

(51) Int. Cl.
*A63F 13/332* (2014.01)
*A63F 13/46* (2014.01)
(Continued)

(52) U.S. Cl.
CPC ............ *A63F 13/332* (2014.09); *A63F 13/46* (2014.09); *A63F 13/69* (2014.09); *A63F 13/58* (2014.09);
(Continued)

(58) Field of Classification Search
CPC .... A63F 2300/57; A63F 13/12; A63F 13/332; A63F 13/46; A63F 13/58; A63F 13/69; A63F 13/822
See application file for complete search history.

(56) References Cited

U.S. PATENT DOCUMENTS 7,431,646 B2    10/2008  Jackson
2002/0155892 A1  10/2002  Mishina et al.
(Continued)

FOREIGN PATENT DOCUMENTS

JP    08-332282    12/1996
JP    2001-129240  5/2001
(Continued)

OTHER PUBLICATIONS

Decision to Grant dated Sep. 17, 2013, in Japanese Patent Application No. 2013-081240 with English translation.
(Continued)

*Primary Examiner* — Seng H Lim
(74) *Attorney, Agent, or Firm* — Oblon, McClelland, Maier & Neustadt, L.L.P.

(57) ABSTRACT

When a mobile terminal obtains a container upon movement of a display range, a processor increases points in a storage unit. When the mobile terminal opens a container obtained by movement of the display range or as a present from another mobile terminal, the processor opens the container at predetermined success percentages, and writes an item obtained from the opened container in the storage unit. When the mobile terminal presents a container without opening it, the processor transmits screen data indicating a present to the other mobile terminal. The processor converts an item in the storage unit into points to increase the points in the storage unit based on an operation of the user of the mobile terminal.

14 Claims, 20 Drawing Sheets

Related U.S. Application Data division of application No. 14/099,665, filed on Dec. 6, 2013, now Pat. No. 8,840,467.

(51) Int. Cl.
  *A63F 13/69* (2014.01)
  *A63F 13/58* (2014.01)
  *A63F 13/822* (2014.01)

(52) U.S. Cl.
  CPC ......... *A63F 13/822* (2014.09); *A63F 2300/57* (2013.01)

(56) References Cited

U.S. PATENT DOCUMENTS

| | | |
|---|---|---|
| 2007/0178963 A1 | 8/2007 | Sato |
| 2009/0186694 A1 | 7/2009 | Gunawardana et al. |
| 2010/0041472 A1 | 2/2010 | Gagner et al. |
| 2012/0214568 A1 | 8/2012 | Herrmann |
| 2013/0281206 A1 | 10/2013 | Lyons et al. |
| 2013/0281207 A1 | 10/2013 | Lyons et al. |
| 2013/0281208 A1 | 10/2013 | Lyons et al. |
| 2014/0024429 A1 | 1/2014 | Aoki et al. |

FOREIGN PATENT DOCUMENTS

| | | |
|---|---|---|
| JP | 2002-210256 | 7/2002 |
| JP | 2002-219276 | 8/2002 |
| JP | 2002-224456 | 8/2002 |
| JP | 2012-176233 | 9/2012 |

OTHER PUBLICATIONS

"Kaitou Royale". Famitsu Mobage vol. 6, Enterbrain Inc., Jun. 21, 2012, Weekly Famitsu, Extra Number Published on Jul. 19, 2012, pp. 20-22.

"Kishi no Monsho-Ankoku no Yosai", APPLISTYLE, vol. 9, Eastpress, Jun. 27, 2012, p. 192.

"Sengoku Collection", Famitsu Mobage vol. 1, Enterbrain Inc., Apr. 14, 2011, Weekly Famitsu, Extra Number Published on May 19, 2011, pp. 44-47.

JP 2012-268225 Office Action, dated Jan. 11, 2013 (English Translation).

JP 2012-268225 Office Action, dated Mar. 12, 2013.

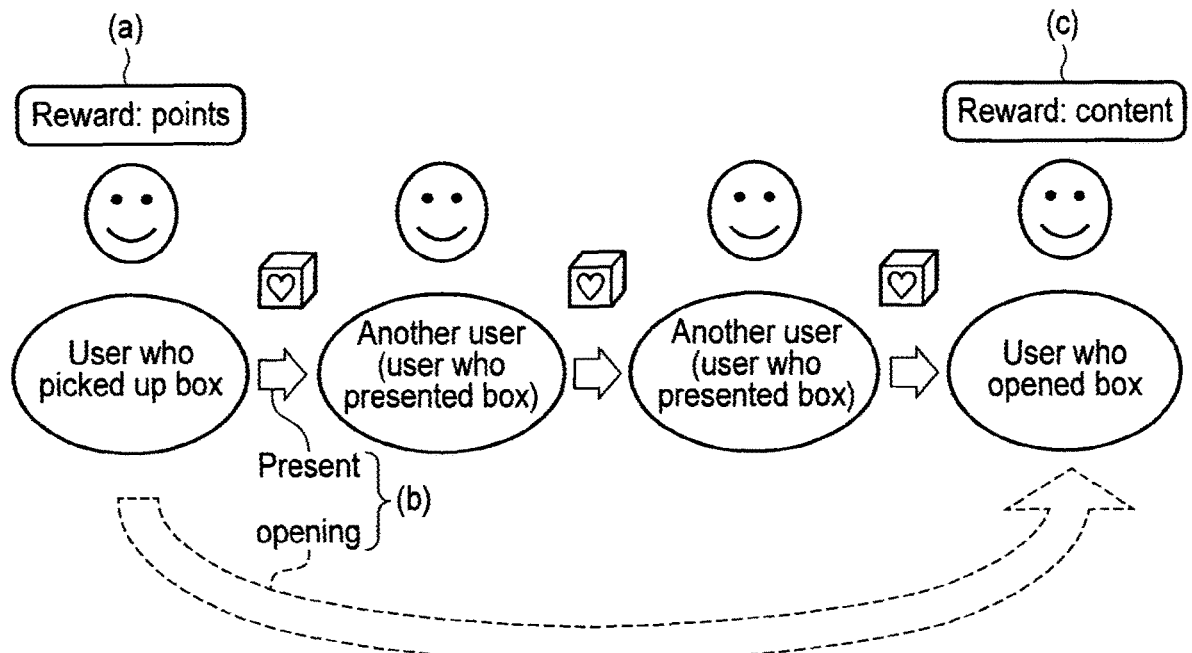

FIG. 1

| Example of parameters ||
|---|---|
| Name | Explanation |
| Point | Obtained upon point conversion of material<br>Obtained upon point conversion of composite item<br>Obtained when box is picked up<br>Obtained at help response |
| HP (stamina) | Upper limit value is extended when level is raised<br>Partially restored when help request is sent to companion when HP = 0 and response of companion is received |
| Level | Level is raised when experience value gauge comes up<br>Next stage of quest is released when level is raised |
| Experience value | Increased when items are composited |
| Companion upper limit count | Increased according to number of presented boxes |

FIG. 2

| Stage | Rank of box | Box pickup point | Rank of material | Material point | Rank of composite item | Point of composite item |
|---|---|---|---|---|---|---|
| 1 | A | 10 | B | Values "1" to "10" | +A | Total of material points + 10 points |
| 2 | 2A | 20 | 2B | Values "11" to "20" | +2A | Total of material points + 20 points |
| 3 | 3A | 30 | 4B | Values "21" to "30" | +3A | Total of material points + 30 points |

FIG. 5

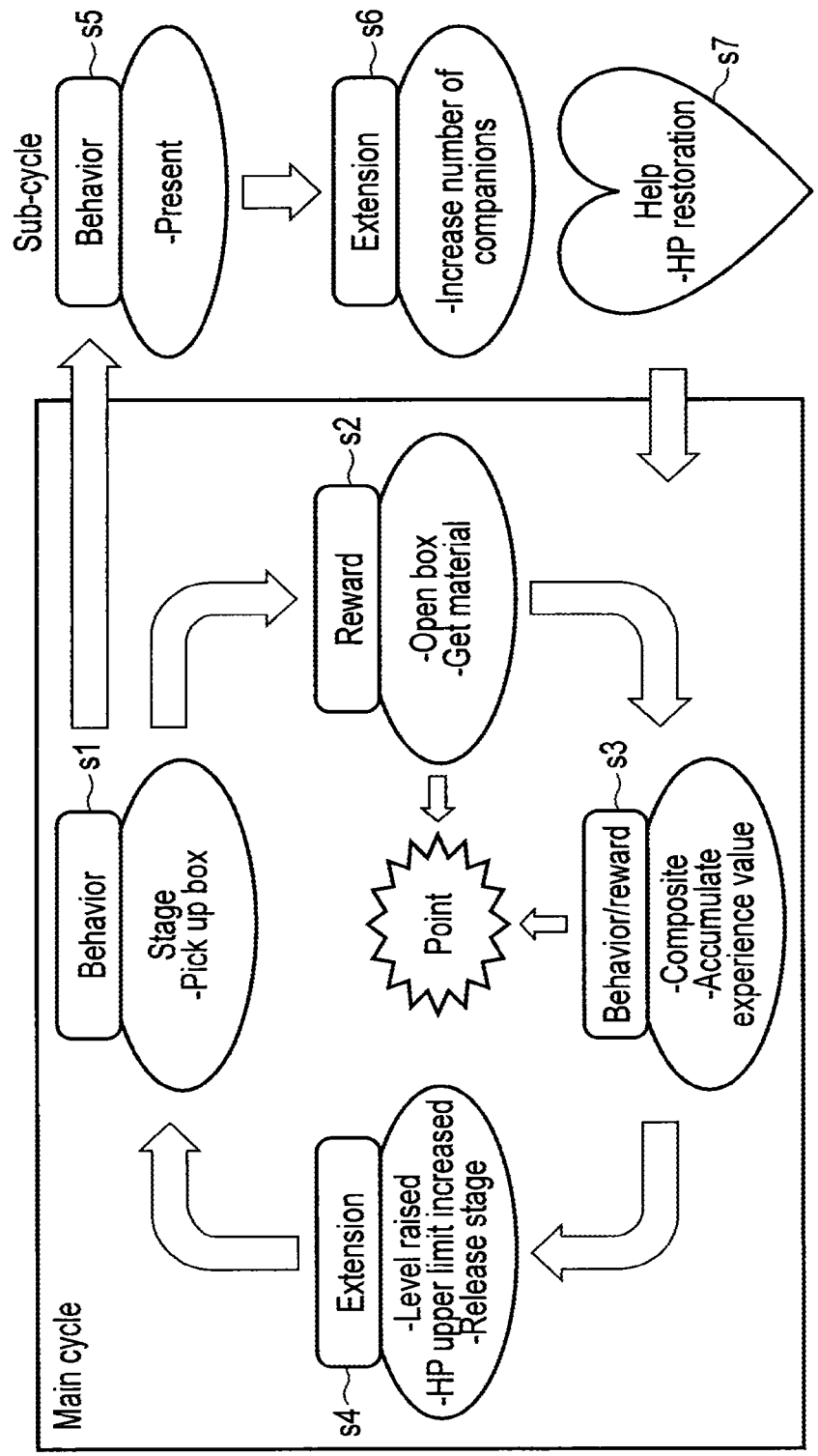
F I G. 6

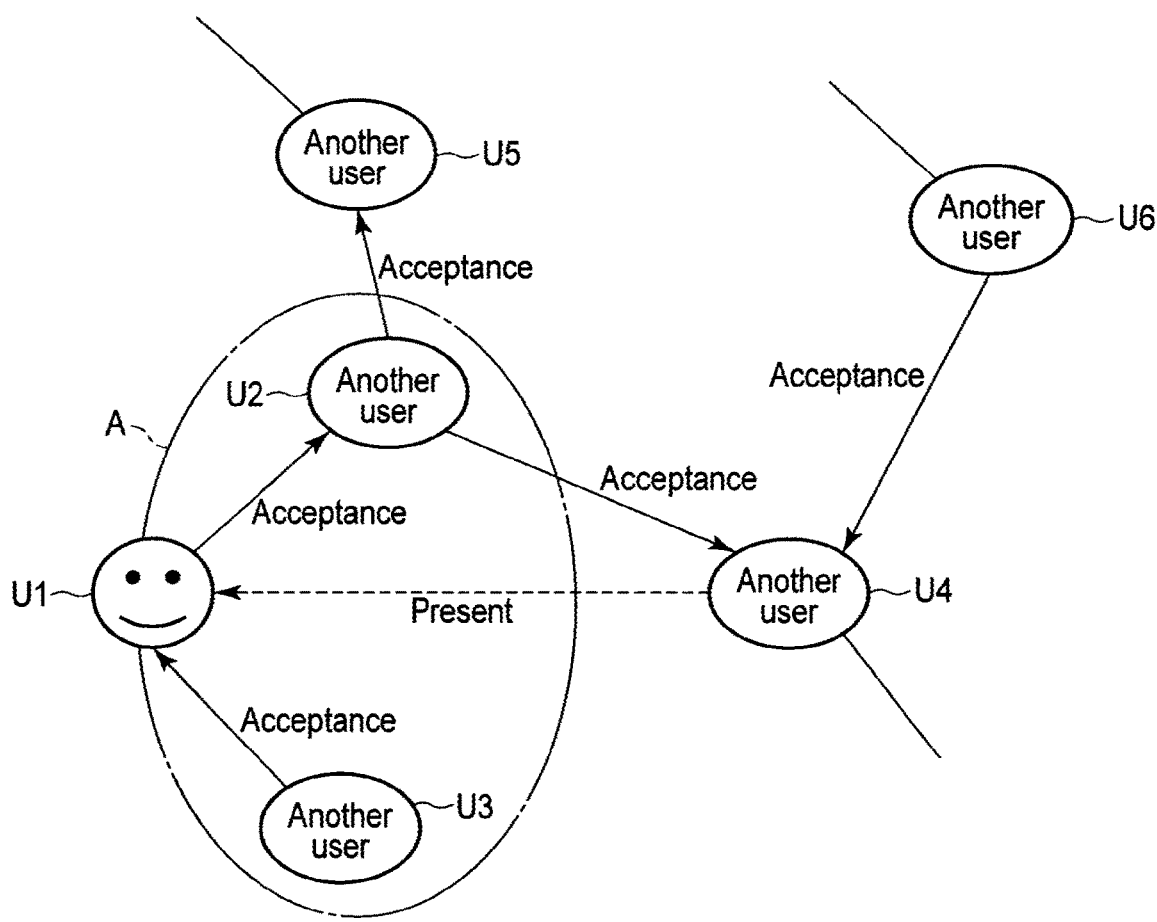

FIG. 7

| Example of setting of special item |||||
|---|---|---|---|
| Use application | Aim | Number of items to be consumed | Remarks |
| HP maximum restoration | Time saving | 1 | HP is restored to upper limit value |
| Composition success | Percentages raised | 1 | Rare composition percentages = 100% |
| Opening success | Percentages raised | 1 | Opening percentages = 100% |
| Threefold increase in pickup box count | Time saving | 3 | Number of boxes to be obtained per pick up is increased from 1 → 3 |
| Possessed item upper limit count extension by 5 items | Extension | 1 | Upper limit count of possessed items is increased by 5 items |

FIG. 8

| User management information | |
|---|---|
| User identification information | U1 |
| Password | xxxx |
| Terminal identification information | yyyy |
| Purchase information | zzzz |

| Game status information | |
|---|---|
| User identification information | U1 |
| Terminal identification information | yyyy |
| Character name | C-chan |
| Point | 99999 |
| HP (stamina) | 20 |
| HP upper limit value | 30 |
| Level | 3 |
| Experience value (value according to composition count) | 5 |
| Present destination breakdown | U2: 2<br>U3: 1<br>⋮ |
| Identical present destination upper limit count/day | 3 |
| Companion user identification information | U2,U3,U8 |
| Companion user terminal identification information | hhhh,iiii,jjjj |
| Companion upper limit count | 10 |
| Possessed item | a,b,d,e,h |
| Item possession count upper limit | 7 |
| Possessed special item count | 1 |
| Help request count | 2 |
| Help response count | 1 |
| Opened box count | 12 |

Box management information
| Stage number | Box identification information | Pickup point | Contained material | Present upper limit count | Possession user log | Box disappearance flag |
|---|---|---|---|---|---|---|
| 1 | p1 | 10 | a | 5 | U1,U2 | 0 |
| 1 | p2 | 10 | b | 7 | U1 | 0 |
| ⋮ | ⋮ | ⋮ | ⋮ | ⋮ | ⋮ | ⋮ |
F I G. 13
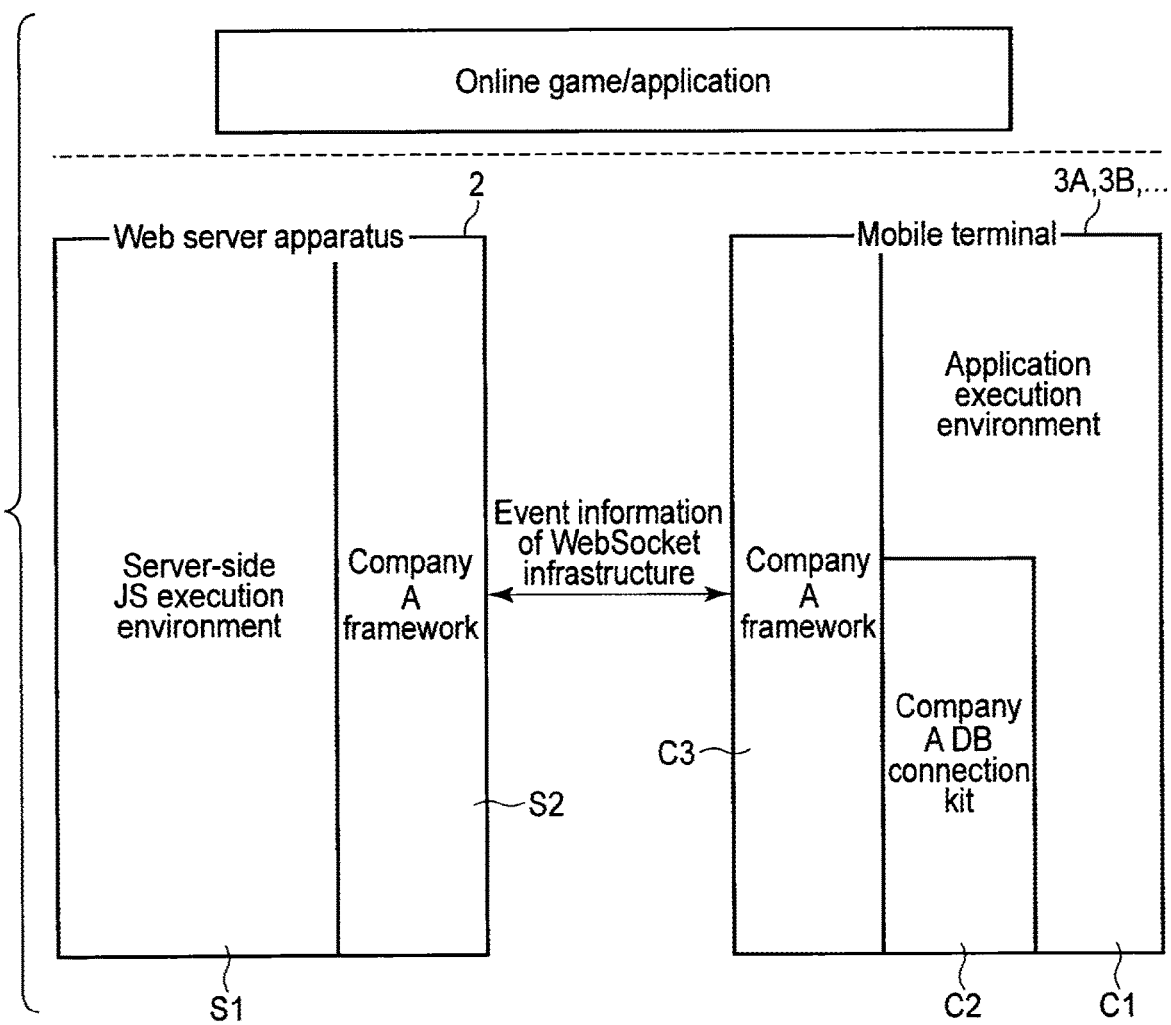
F I G. 14

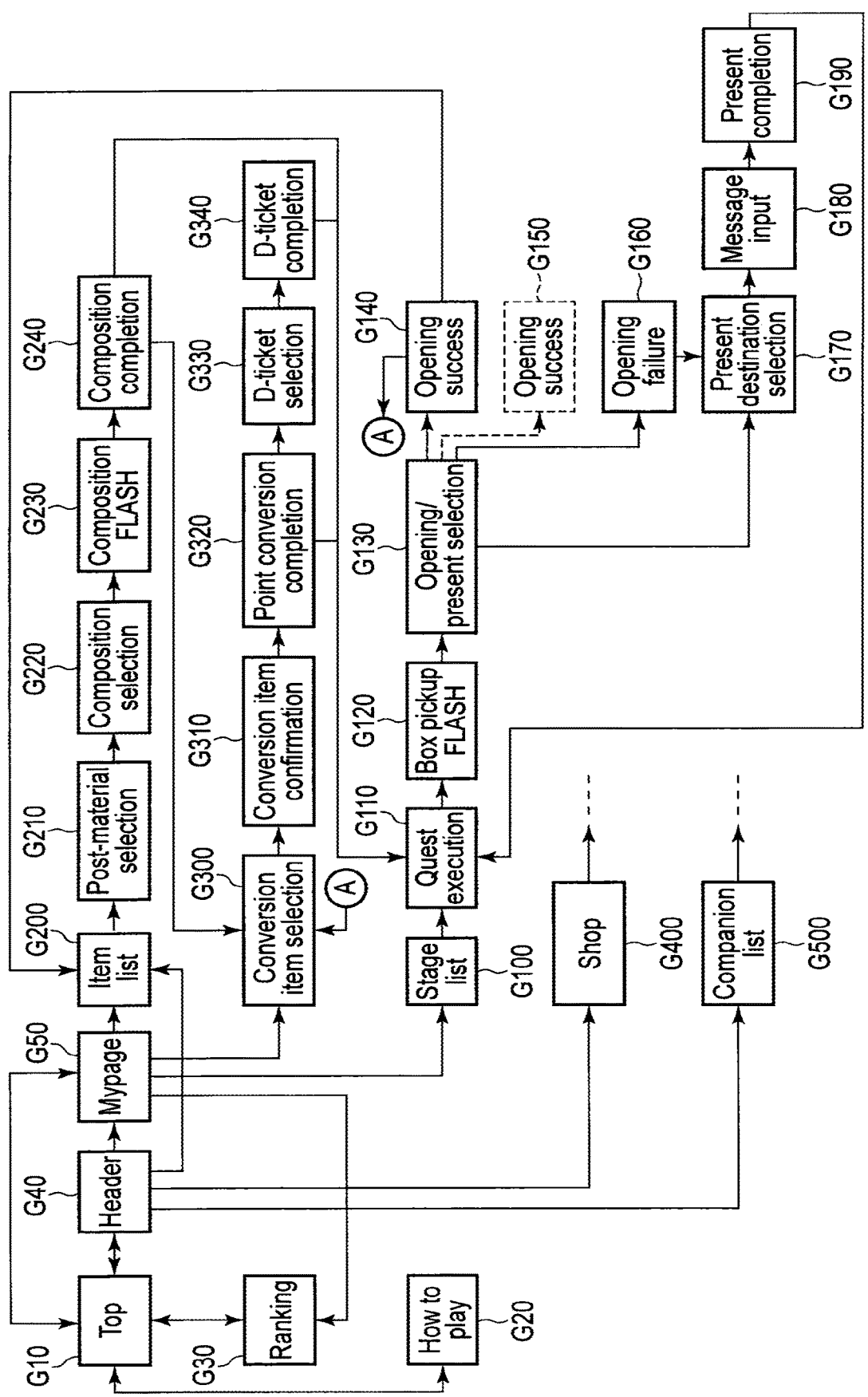
F I G. 16

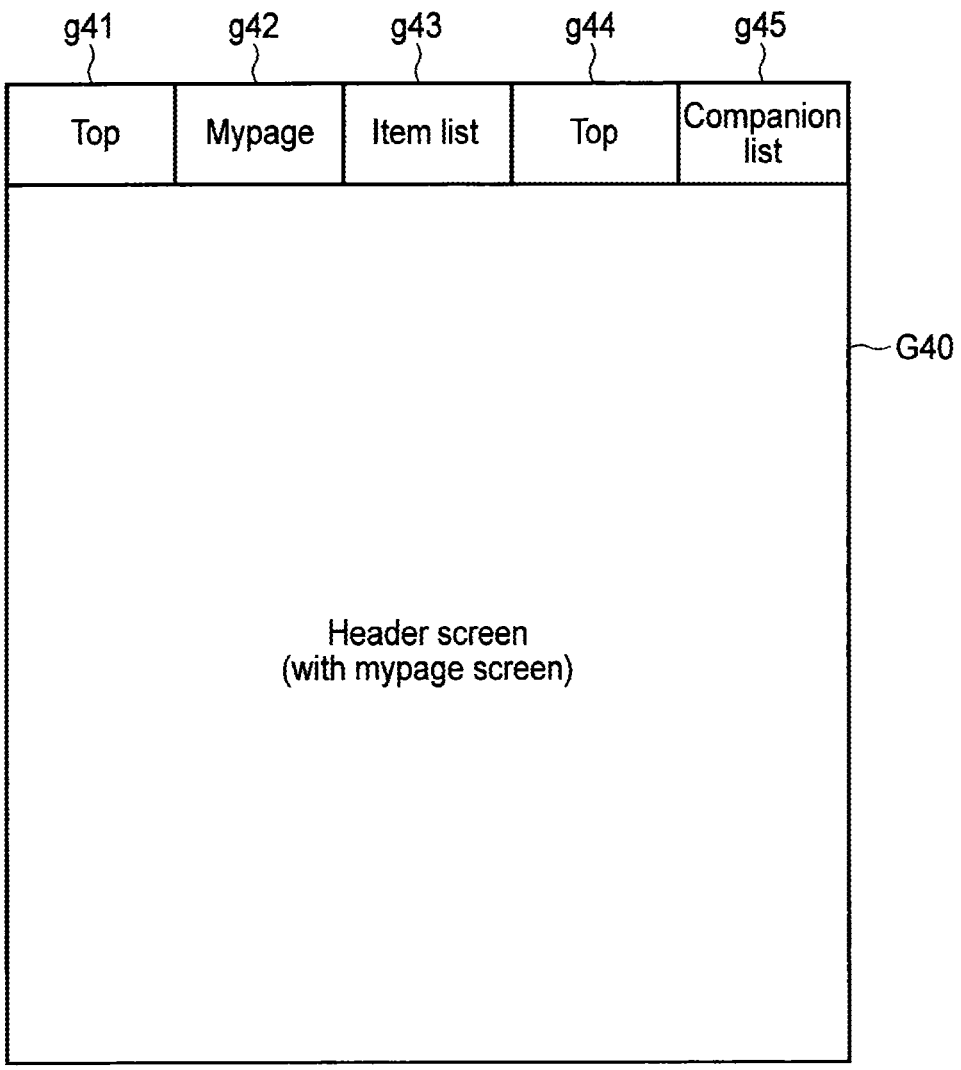
F I G. 18

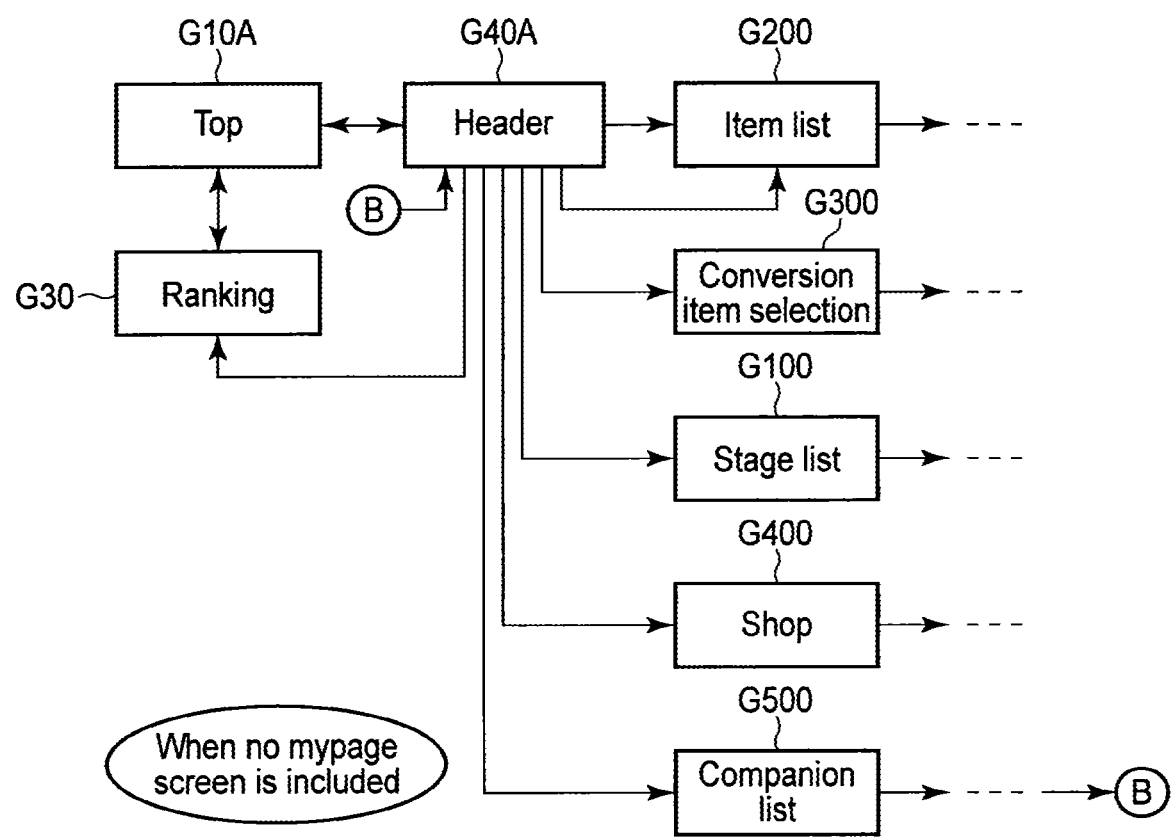
F I G. 19

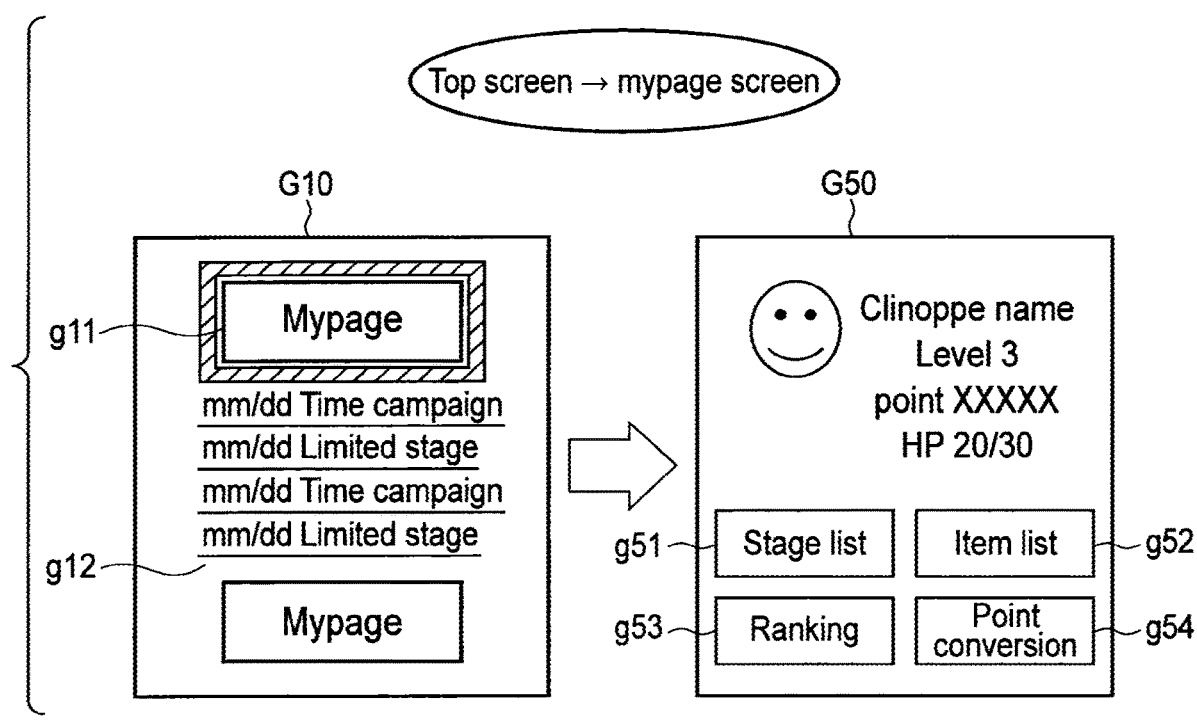
F I G. 21

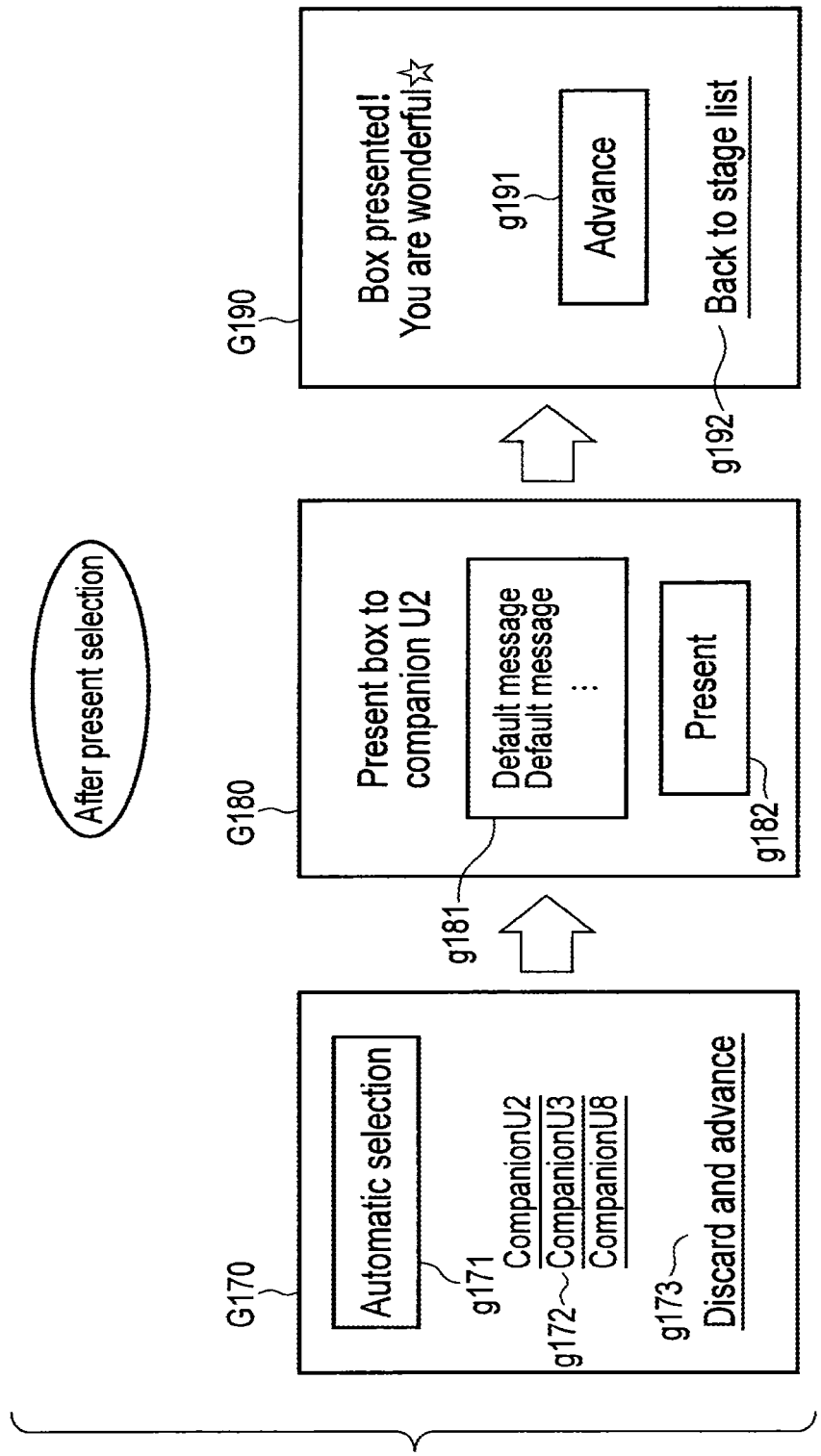
F I G. 24

GAME CONTROL METHOD, SERVER APPARATUS, AND STORAGE MEDIUM

CROSS-REFERENCE TO RELATED APPLICATIONS

This application is a continuation of U.S. application Ser. No. 14/454,329, filed Aug. 7, 2014, which is a divisional of U.S. application Ser. No. 14/099,665, filed Dec. 6, 2013, which is based upon and claims the benefit of priority from Japanese Patent Applications No. 2012-268225, filed on Dec. 7, 2012, and No. 2013-81240, filed on Apr. 9, 2013, the entire contents of all of which are incorporated in its entirety.

BACKGROUND OF THE INVENTION

1. Field of the Invention

The present invention relates to a game control method, server apparatus, and storage medium.

2. Description of the Related Art

In recent years, in the game field, treasure box specifications in which a character gets a treasure box which contains an item in advance, and opens the treasure box to acquire the item according to user operations are available (for example, see Jpn. Pat. Appln. KOKAI Publication No. 2002-219276 (see the first and the second paragraphs)).

Jpn. Pat. Appln. KOKAI Publication No. 2002-219276 describes a roll playing game (RPG), which causes the user to find a treasure box item and obtain a key item by handling the movement of a character, and to open the treasure box item by the obtained key item, so as to get a virtual item.

A game which uses the aforementioned treasure box specifications normally does not pose any problem; however, according to the examination of the present inventors, one user merely acquires an item, and sociality by cooperation with companions is not accomplished.

BRIEF SUMMARY OF THE INVENTION

An object of the present invention is to provide a game control method, a server apparatus, and a storage medium which can accomplish sociality by cooperation with companions in a game in which a user acquires an item from a container which contains an item in advance.

One aspect of the present invention, there is provided a game control method, which is used in a server apparatus which comprises a processor and a storage device and is configured to communicate with a plurality of mobile terminals, the method being required to control each mobile terminal to individually execute a game in which a container that contains an item in advance is obtained by moving a display range for each mobile terminal in a virtual space based on an operation of a user of the mobile terminal or a container that contains an item in advance is obtained as a present from another mobile terminal, and points corresponding to the container and the item are accumulated, the method comprising: a step of controlling the processor to store, for each user, user identification information required to identify the user, terminal identification information required to identify the mobile terminal and the points in the storage device in association with each other; a first point increase step of controlling the processor to increase, when the container included in the display range is obtained based on an operation of the user of the mobile terminal, the points stored in the storage device in association with the terminal identification information of the mobile terminal; an opening step of controlling the processor to open, when opening of the container obtained by movement of the display range or as a present from another mobile terminal is selected based on an operation of the user of the mobile terminal, the container at predetermined success percentages to obtain an item from the opened container and to write the obtained item in the storage device in association with the terminal identification information of the mobile terminal, or to fail to be opened the container based on failure percentages correlated to the success percentages; a present step of controlling the processor to transmit, when the obtained container or the container, which has failed to open, is presented to a user of another mobile terminal based on an operation of the user of the mobile terminal, screen data indicating a present of the container to the other mobile terminal; and a second point increase step of controlling the processor to convert an item stored in the storage device in association with the terminal identification information of the mobile terminal into points based on an operation of the user of the mobile terminal, and to increase the points stored in the storage device in association with the terminal identification information by converted points.

According to one aspect of the present invention, sociality by cooperation with companions is accomplished in a game in which a user acquires an item from a container which contains an item in advance.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view for explaining "opening" and "present" in an overview of the present invention;

FIG. 2 is a table for explaining an example of parameters in the overview;

FIG. 5 is a table for explaining an example of parameters in the overview;

FIG. 6 is a view for explaining a main cycle and sub-cycle in the overview;

FIG. 7 is a view for explaining a range of companions in the overview;

FIG. 8 is a table for explaining an example of settings of a special item;

FIG. 11 is a table for explaining user management information according to the embodiment;

FIG. 12 is a table for explaining game status information according to the embodiment;

FIG. 13 is a table for explaining box management information;

FIG. 14 is a view showing an overview of a connection architecture between a Web server apparatus and mobile terminal according to the embodiment;

FIG. 16 is a chart showing an example of screen transitions to which the game control method according to the embodiment is applied;

FIG. 18 is a view showing an example of a header screen according to the embodiment;

FIG. 19 is a chart showing a modification of screen transitions according to the embodiment;

FIG. 21 is a view showing a screen transition example from a top screen to a mypage screen according to the embodiment;

FIG. 24 is a view showing an example of screen transitions after present selection according to the embodiment;

DETAILED DESCRIPTION OF THE INVENTION

Figure 3:
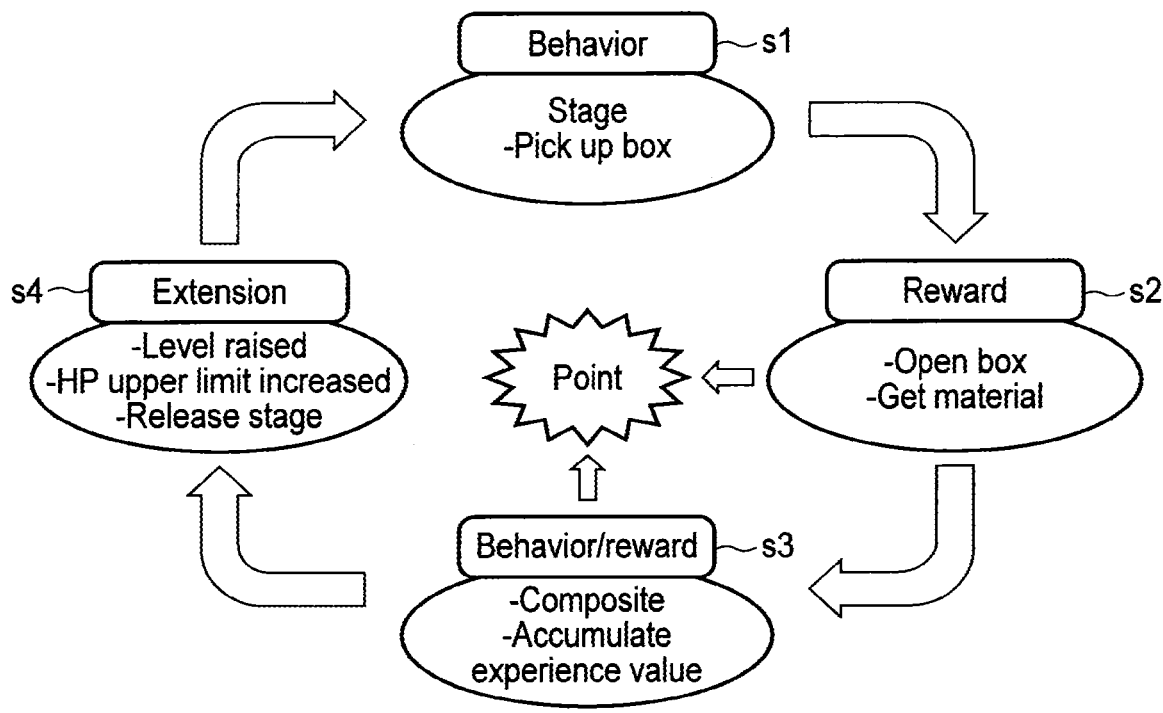
FIG. 3 is a view for explaining a main cycle in the overview.

One embodiment of the present invention will be described hereinafter with reference to the drawing. Prior to a description, an overview of the present invention will be described below with reference to FIGS. 1, 2, 3, 4, 5, 6, 7, 8, and 9. Note that the overview to be described below uses practical terms such as "box" and "pick up", but the present invention is not limited to the description of the overview. For example, a "box" can be a "container" (for example, it can be "bag"), and to "pick up" may be to "take up" or "obtain".

The overview of the present invention relates to a game in which a user opens an item-containing box or presents that box to a companion, and contests a ranking position by a total of finally obtained points, as shown in FIG. 1 and (a) to (d) below.

(a) A user picks up a box (container) containing a material (item) and obtains points. These points can be obtained when the user picks up the box irrespective of whether or not the user opens the box.

(b) The user opens the box at given success percentages (or at 100% using a special item), or presents the box to another user. The special item is given when the user satisfies a predetermined condition (for example, when a predetermined login count is exceeded or when the user purchases the item using in-game currency). Likewise, the in-game currency is given when the user satisfies a predetermined condition (for example, when a level of a character is raised or when the companion upper limit count is increased). Note that a material in the box cannot be confirmed until the box is opened. Even when the user fails to open the box, the box and the material are not broken. The user may present the box, which has been failed to be opened. The user may further present the presented box. However, when a box present count exceeds an upper limit, that box disappears. An upper limit presentable count/day to a single user may be set. Percentages at which the user can open the picked-up box are the same as those at which he or she can open the presented box.

(c) The user composites materials obtained by opening boxes to obtain a composite item.

(d) A material or a composite item is converted into points.

FIG. 2 shows an example of parameters such as a point, HP, level, experience value, and companion upper limit count.

A point value corresponds to a score required to decide a ranking position, and is obtained, for example, (1) when a material is converted into a point, (2) when a composite item is converted into a point, (3) when the user picks up a box, or (4) when the user responds to a help request.

An HP (Health Point: stamina) value indicates a stamina of a character in the game. The HP value is decreased every time the character is moved, and is partially restored when the user sends a help request to a companion when the HP (stamina)=0 and the companion responds to the request. Note that "partial restoration" means that the HP is restored not to an HP upper limit value but by only a predetermined value less than the HP upper limit value. The HP upper limit value is a value which indicates an upper limit of the HP (stamina) value, and is extended when the level of the character is raised.

A level is a rank of a gauge according to an item composition experience value, and it is transitioned to an upper level (a level is raised) when a gauge of an experience value reaches a maximum amount. When the level is raised, a next stage of a quest is released. Note that the relationship between levels and stages is a one-to-one relationship when the user plays at a playable highest stage (for example, a relationship in which level "3" corresponds to stage "3"), but although the level is never lowered since it corresponds to the experience value, the user can play at a lower stage according to his or her choice.

An experience value is a value according to an item composition count, and is increased when the user composites items.

A companion upper limit count is the upper limit number of other users who can be a user's companions, and is increased according to the number of boxes the user presented.

This game is expressed by a main cycle which goes around four phases s1 to s4 including a behavior phase s1, reward phase s2, behavior/reward phase s3, and extension phase s4, as shown in FIG. 3.

The behavior phase s1 corresponds to (a) above, and the user behaves to pick up boxes in each stage.

The reward phase s2 corresponds to (b) above, and the user opens a box to obtain a material (reward) in this phase. Note that the phase s2 may correspond to (d) above, and an obtained material may be converted into points.

The behavior/reward phase s3 corresponds to (c) above, and the user behaves to composite materials, and accumulates an experience value (receives a reward) in this phase. Note that this phase s3 may correspond to (d) above, and a composite item obtained by composition may be converted into points.

In the extension phase s4, a level is raised according to an experience value, and an HP upper limit value is increased and the next stage is released as the level is raised. That is, in this phase, the HP upper limit value and executable stage are extended. In the next stage, the main cycle including the four phases is executed in the above description.

Figure 4:
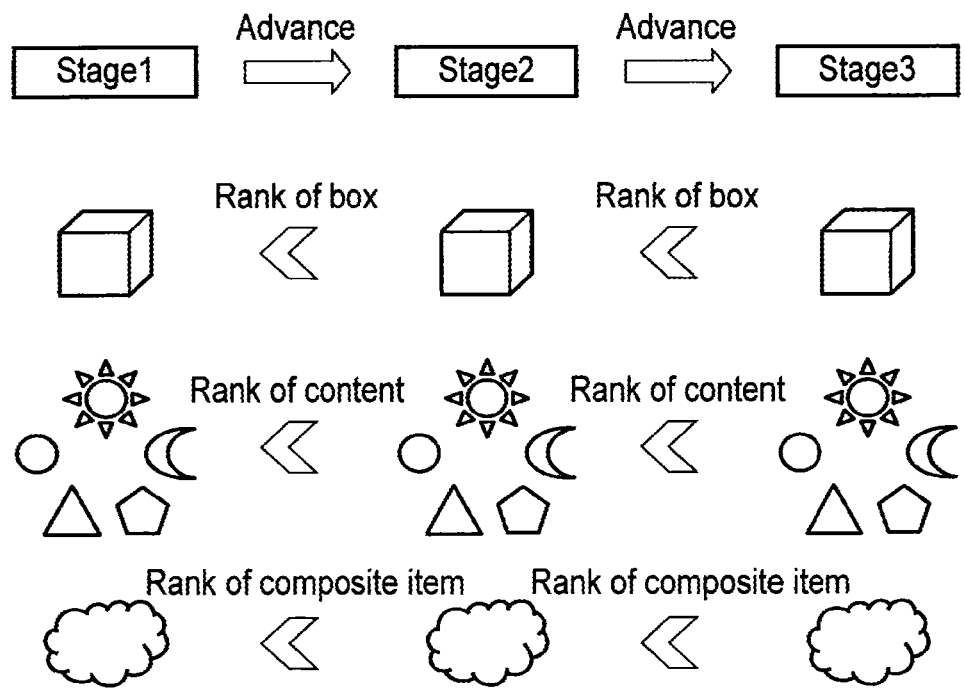
FIG. 4 is a view for explaining stages, boxes, materials, and composite items in the overview.

Stages, boxes, materials, and composite items will be described below with reference to FIGS. 4 and 5.

In the game, boxes of a rank according to a stage are placed, for example, by dropping at given appearance percentages. As a stage is higher, a rank of each box is higher. Pickup points of a box may be increased according to a rank of that box.

A box contains one material according to its rank. As a rank of a box is higher, that of a material in the box is higher.

A conversion point range of a material is determined based on a rank of the material. A conversion point value of a composite item is also based on ranks of materials before composition. However, by making a total of conversion point values of materials before composition lower than a conversion point value of a composite item, a value (point value, experience value) is added to composition.

To the main cycle in which stages are elevated, a sub-cycle required to accomplish sociality by cooperation with companions is added.

The sub-cycle has three phases s5 to s7 including a behavior phase s5, extension phase s6, and help phase s7, as shown in FIG. 6.

The behavior phase s5 corresponds to (b) above, and the user behaves to present a picked-up box to another user.

In the extension phase s6, the companion upper limit count is increased (extended) by presents.

In the help phase s7, when an HP (stamina) value=0, the user sends a help request to a companion, and an HP value is partially restored by a companion's response.

Note that a companion for a given user is another user who exchanged a companion acceptance request and acceptance response with that user. For example, as shown in FIG. 7 which shows a companion range A of a user U1, a user U2 whom the user U1 accepted or a user U3 who accepted the user U1 is a companion of the user U1. Even a user U4 who gave a present to the user U1 is not a companion of the user U1 unless the user U1 accepts the user U4 or vice versa. Also, the user U4 and a user U5 accepted by the user U2 who is a companion of the user U1 are not companions of the user U1 unless the user U1 accepts the users U4 and U5 or vice versa. The user U1 cannot release the acceptance of the users U2 and U3 accepted as companions during a single event.

Note that as for the user U1, an incentive may be allocated for each given total number value of boxes obtained by all the users within the companion range A, U1, U2, and U3. As an incentive, for example, an HP value may be restored to a maximum value, and an HP upper limit value may be temporarily doubled. Even when the HP value is lowered again during a period in which the HP upper limit value is doubled, a special item can be used in HP maximum restoration to restore the HP value to the doubled HP upper limited value. That is, during the period in which the HP upper limit value is doubled, since a value of the special item is also temporarily doubled, consumption of the special item can be further promoted. Such incentive is preferably allocated from the viewpoint that making respective users more enjoy and play an event. Since a criterion of the incentive is the "total number of boxes", the gaps existing at companion cooperataion between heavy users and light users can be reduced.

As for the special item, for example, one type is used, and consumption counts are set for respective use applications for the sake of easy special processing, as exemplified in FIG. 8. Note that in FIG. 8, aims and remarks further set for use applications are included in descriptions of the use applications, and can be omitted as long as the use applications are clear.

As the use applications (and consumption counts) of the special item, for example, HP maximum restoration (which consumes one special item), composition success (which consumes one special item), open success (which consumes one special item), threefold increase in pickup box count (which consumes three special items), extension of possessed item upper limit count by 5 items (which consumes one special item), and the like can be used as needed. Note that numerical values of counts, multiples, and the like can be arbitrarily set. Also, by processing for limiting a time window in which the special item can be consumed (time-limited chance), consumption of the special item may be promoted, and a merit of use of the special item may be provided, thus making the special item more valuable.

The possessed item upper limit count is an upper limit number of materials/items which can be possessed by the user. Since the possessed item upper limit count is set, the user plays the came while compositing obtained items or converting them into points as needed.

Figure 9:
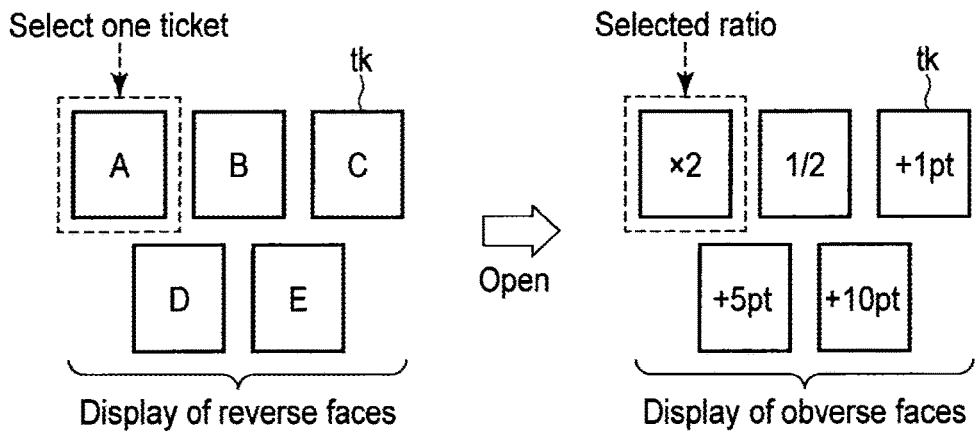
FIG. 9 is a view for explaining a double-up ticket in the overview.

After point conversion, the user can arbitrarily use a double-up ticket tk which can double the converted points, as shown in FIG. 9.

Reverse faces A to E of double-up tickets tk are displayed to hide ratios and additional points before use. When the user selects one of reverse faces A to E at the time of use, the selected ticket is opened to display an obverse face indicating a ratio "×2" or "×½" or additional points "+1", "+5", or "+10". Converted points of the user are increased/decreased according to the ratio or additional points described on the obverse face of the selected double-up ticket tk.

The user can use one double-up ticket tk per point conversion.

Not all of the points possessed by the user are subjected to be increased/decreased by the double-up ticket tk but only converted points are.

The double-up tickets tk are given away for free only.

In the aforementioned game, for example, a personal goal (point total), a companion coordination goal (companion upper limit count, help response), a goal of all companions (box total count, point total), and overall ranking goal (point total) are set for respective user layers such as light users and heavy users, thus also attaching importance on companion invitation and sociality.

Also, since the aforementioned game appeals to a sense of "don't want to waste" (sense of "waste not") of girls, and allows the user to present a material-containing box to another user, it can be used for retention (preservation/attraction) of a companion relationship.

The overview of the present invention has been described. An embodiment of the present invention will be described in detail below.

Figure 10:
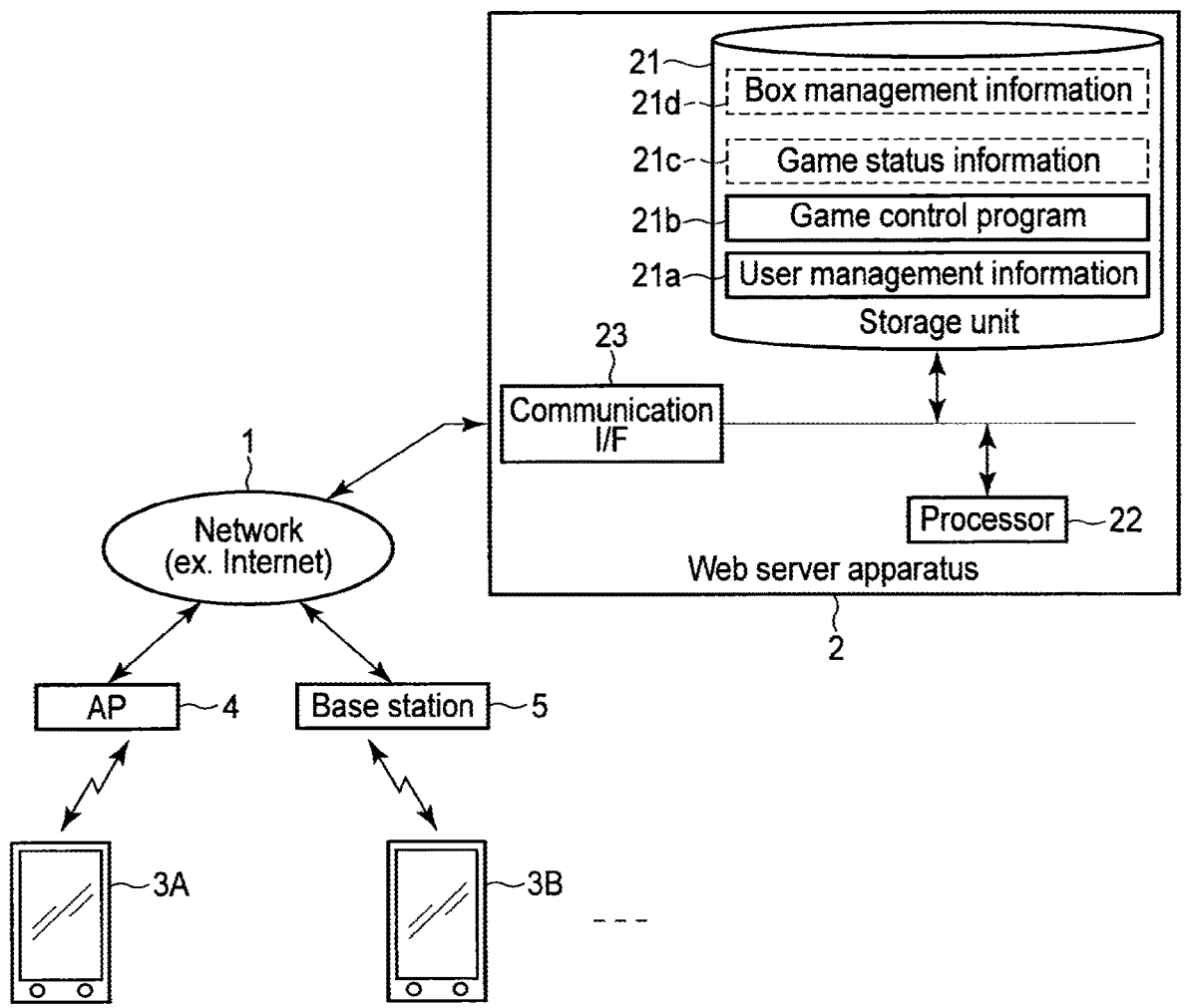
FIG. 10 is a schematic block diagram showing an example of the arrangement of a game system to which a game control method according to one embodiment of the present invention is applied.

FIG. 10 is a schematic block diagram showing an example of the arrangement of a game system to which the game control method according to one embodiment of the present invention is applied. In this game system, to a network 1 including the Internet or the like, a Web server apparatus 2 is connected, and a plurality of mobile terminals 3A, 3B, . . . as client apparatuses used by users are connected via an access point (AP) 4 of a wireless LAN (Local Area Network) or base station 5. Each of these apparatuses can be implemented by either the hardware arrangement or combined arrangement of hardware resources and software. As software of the combined arrangement, a program which is installed in advance from a network or non-transitory computer-readable storage medium in a computer, and is executed by a processor of that computer to cause the computer to implement functions of the apparatus is used.

The Web server apparatus 2 is a computer which executes a game control program which causes the mobile terminals 3A, 3B, . . . to individually execute the game. This Web server apparatus 2 is installed by an SNS (Social Networking Service) company so as to provide an online game service as part of services, and is connected to the network 1.

The functional block arrangement of the Web server apparatus 2 includes a storage unit 21, processor 22, and communication interface (to be referred to as a communication I/F hereinafter) 23.

The storage unit 21 stores user management information 21a and a game control program 21b. At the beginning of the game, the storage unit 21 further stores game status information 21c and box management information 21d. The game status information 21c and box management information 21d are updated and stored by the processor 22 according to an execution state of the game control program 21b.

As shown in FIG. 11, the user management information 21a describes, for each user, user identification information required to identify the user, a user authentication password, terminal identification information required to identify a mobile terminal of the user, and purchase information (for example, possessed in-game currency information) required to judge whether or not the user can purchase a special item in association with each other.

The game control program 21b controls the processor 22 to execute respective steps of the Web server apparatus 2 (to be described later).

The game status information 21c describes, for each user, user identification information, terminal identification information, a character name, a point value, an HP (stamina) value, HP upper limit value, a level, an experience value (a value according to a composition count), a present destination breakdown, an identical present destination upper limit count/day, companion user identification information, companion user terminal identification information, a companion upper limit count, possessed items, an item possession count upper limit, a special item possession count, a help request count, a help response count, and an opened box count in association with each other, as shown in FIG. 12. However, the game status information 21c need not always include all these pieces of information. For example, a character name, HP (stamina) value, HP upper limit value, level, experience value (a value according to a composition count), present destination breakdown, identical present destination upper limit count/day, companion user identification information, companion user terminal identification information, companion upper limit count, item possession count upper limit, special item possession count, help request count, help response count, and opened box count can be omitted as needed.

The user identification information and terminal identification information are the same as those in the user management information 21a.

The character name is information indicating a name of a character in the game.

The point value, HP (stamina) value, HP upper limit value, level, experience value, and companion upper limit count are the same pieces of information shown in FIG. 2 and the above description.

The present destination breakdown is information which indicates user identification information required to identify a user as a box present destination with a present count in association with each other.

The identical present destination upper limit count/day is a value indicating an upper limit count presentable to an identical present destination per day.

The companion user identification information is user identification information required to identify a companion user.

The companion user terminal identification information is that required to identify a mobile terminal of the companion user.

The possessed items are information indicating items possessed by opening boxes, and are also information further indicating a composite item upon creating the composite item by compositing items (materials).

As materials, for example, items which represent meats, vegetables, and the like are individually applicable. As a composite item, an item which represents a dish prepared by compositing meats and vegetables (for example, stir-fried meats and vegetables, curry, or the like) is applicable. However, meats, vegetables, dishes, and the like are examples of items. As shown in FIG. 4, materials may be expressed by figures (those of a circular shape, sun shape, moon shape, triangular shape, pentagonal shape, and the like), and a composite item may be expressed by another figure (that of a cloud shape). That is, the materials and composite items may not have a relationship of "materials" and "composites" in daily life.

The item possession count upper limit is a value indicating an upper limit of a total of the number of items possessed by opening boxes, and the number of composite items possessed by composition.

The special item possession count is a value indicating an upper limit of the number of possessed special items.

The help request count is a value indicating the number of times of help requests to companions when the HP value=0.

The help response count is a value indicating the number of times of responses to help requests from companions.

The opened box count is a value indicating the number of boxes which are opened without being presented or discarded of picked-up boxes and presented boxes.

The box management information 21d describes, for each box, a stage number, box identification information, pickup point value, contained material, present upper limit count, possessing user log, and box disappearance flag in association with each other, as shown in FIG. 13. However, the box management information 21d is arbitrary information, and may be omitted.

The stage number is a number required to identify a stage which is being executed.

The box identification number is that required to identify a box.

The pickup point value indicates a point value added when the user picks up a box.

The contained material is identification information indicating a material contained in a box.

The present upper limit count is a value indicating an upper limit for presentable count of a box, and is compared with the number of pieces of user identification information in the possessing user log.

The possessing user log describes user identification information indicating a user who picked up a box, and that indicating a user as a box present destination. In the possessing user log, when the number of pieces of user identification information as present destinations reaches the present upper limit count, the box disappears.

The box disappearance flag indicates whether or not a box disappears (or exists). For example, when the box exists, the flag describes a value "0"; when the box disappears, the value is updated to "1".

The processor 22 executes respective steps of the Web server apparatus 2 (to be described later) by executing the game control program 21*b*.

The communication I/F 23 has a function of executing communications between the Web server apparatus 2 and the terminals 3A, 3B, . . . .

On the other hand, the mobile terminals 3A, 3B, . . . on the client side may be mobile phones which respectively include a smartphone, feature phone, and the like, and operate on an OS (Operating system) such as Android™ or iOS™, or may be a notebook type personal computer, mobile computer, and the like. In the following embodiment, the description will be given under the assumption that all of the mobile terminals 3A, 3B, . . . are smartphones each including a touch panel, display, memory, processor, and communication interface, for the sake of simplicity.

Assume that these mobile terminals 3A, 3B, . . . can preferentially select, for example, Wi-Fi™ as a wireless LAN of the IEEE802.11a/b/g/n standards and can be mutually connected to the access point 4 in addition to the connection to the network 1 via the base station 5.

These mobile terminals 3A, 3B, . . . execute the game on a system environment provided by the Web server apparatus 2.

Also, the mobile terminals 3A, 3B, . . . can be wirelessly connected to each other via, for example, a Bluetooth™ technique as the close proximity wireless communication standard.

As the mobile terminals 3A, 3B, . . . , hardware arrangements unique to their models, adopted OSs, installed applications, and the like are wide-ranging, and the Web server apparatus 2 can deliver various application programs which are compatible to these wide-ranging mobile terminals 3A, 3B, . . . to them.

The hardware arrangements themselves of electronic circuits of the Web server apparatus 2 and the mobile terminals 3A, 3B, . . . are general and known, and their description and explanation will not be given.

FIG. 14 shows the concept of a connection architecture between the Web server apparatus 2 and the mobile terminals 3A, 3B, . . . according to this embodiment. As shown in FIG. 14, upon execution of an online game program or application program provided by Company A, in the mobile terminals 3A, 3B, . . . , an application execution environment C1 for the game program or application program, which is described using, for example, AIR™ or the like, is mounted, and a Company A database connection kit C2 required to connect a database of the Company A to execute accounting processing and the like is embedded.

In addition, a framework C3 on the (software) client side developed by the Company A is installed in association with a part in which the mobile terminals 3A, 3B, . . . communicate with the Web server apparatus 2.

On the other hand, in the Web server apparatus 2 managed by the Company A, a server-side JavaScript™ execution environment S1 described using, for example, Node.js™ is arranged, and a Company A (software) server-side framework S2 corresponding to the framework C3 is arranged in a part which directly communicates with the mobile terminals 3A, 3B, . . . .

Between the framework C3 of the mobile terminals 3A, 3B, . . . and the framework S2 of the Web server apparatus 2, information such as that relating to items is exchanged based on WebSocket as the standard implemented by HTML5™.

In this WebSocket, once a connection is established between the server and client, data exchanges can be executed by socket communications without regard to communication procedures unless they are explicitly disconnected.

The server and all clients, between which a connection has been established via the WebSocket, can share the same data and can exchange data in real time.

Therefore, by utilizing the WebSocket standard, two-way communications between the server and clients can be attained while compensating for demerits of Ajax (Asynchronous JavaScript XML) and Comet communications.

The frameworks C3 and S2 are described using, for example JavaScript as a script language which does not depend on an OS. For this reason, even when the OSs of the mobile terminals 3A, 3B, . . . are any of Android, iOS, and the like, an equivalent connection environment can be built.

Figure 15:
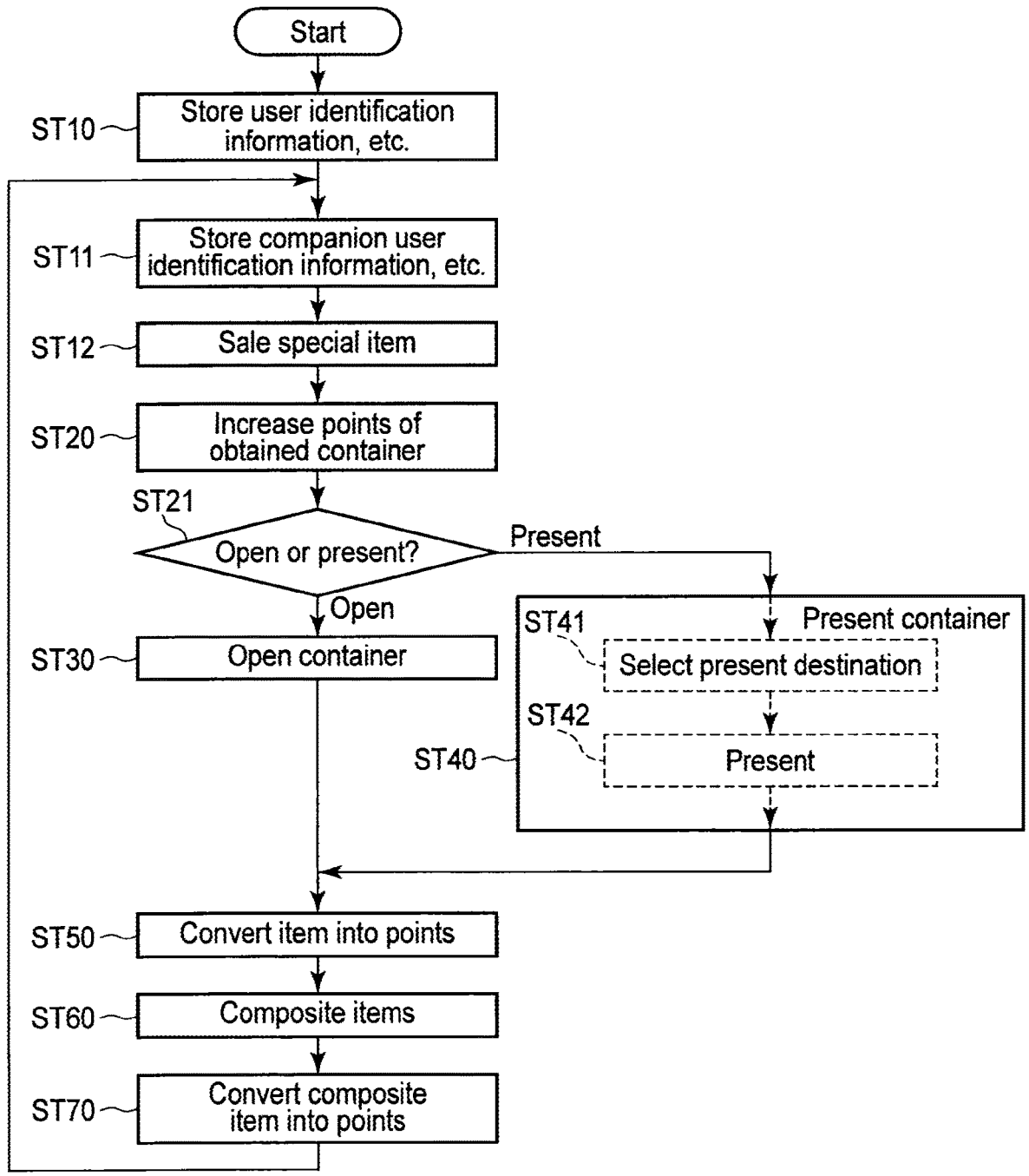
FIG. 15 is a flowchart for explaining the game control method according to the embodiment.

The game control method using the came system with the aforementioned arrangement will be described below with reference to the flowchart shown in FIG. 15. Assume that in the following description, the Web server apparatus 2 stores the user management information 21*a* upon acceptance of first service provision requests from the mobile terminals 3A, 3B, . . . . On the other hand, assume that the execution environments S1 and C1, frameworks S2 and C3, and DB connection kit C2 shown in FIG. 14 are installed in the mobile terminals 3A, 3B, . . . upon acceptance of the first service from the Company A. In the following explanation, a description about the communication I/F 23 which intermediates to exchange data will be omitted for the sake of simplicity.

Initially, the Web server apparatus 2 sequentially receives authentication requests from the mobile terminals 3A, 3B, . . . , executes login authentication, and notifies the mobile terminals 3A, 3B, . . . as authentication request sources of success of authentication. Note that the mobile terminals 3A, 3B, . . . may transmit authentication requests in a random order.

Next, the mobile terminals 3A, 3B, . . . transmit program transmission requests including program identification information of a game service accessed at the login timing to the Web server apparatus 2 by users' touch panel operations.

The processor 22 in the Web server apparatus 2 transmits the game control program 21*b* in the storage unit 21 to the mobile terminal 3A in response to this program transmission request.

The mobile terminal 3A receives this game control program, and writes the program in the memory. Other mobile terminal 3B, . . . similarly receive the game control program from the Web server apparatus 2, and write the program in their memories.

After that, in each of the mobile terminals 3A, 3B, . . . , a processor (not shown) executes the game control program in the memory.

Then, the Web server apparatus 2 controls the mobile terminals 3A, 3B, . . . to individually execute the game in which a box which contains an item in advance is obtained by moving a display range for each of the mobile terminals 3A, 3B, . . . within a virtual space based on a user operation, or a box which contains an item in advance is obtained as a present from another mobile terminal, and a point value corresponding to the boxes and items is accumulated.

That is, the processor 22 in the Web server apparatus 2 stores, for each user, user identification information required to identify the user, terminal identification information required to identify the mobile terminal, and a point value in the storage unit 21 in association with each other (step ST10). For example, the game status information 21c is stored in the storage unit 21.

When a companion acceptance request is transmitted by an operation of the user of the mobile terminal 3A to another mobile terminal 3B, and a companion acceptance response is received from that mobile terminal 3B, the processor 22 in the Web server apparatus 2 may execute processing for writing user identification information of the companion and the terminal identification information of the mobile terminal 3B in the storage unit 21 in association with the terminal identification information of the mobile terminal 3A (step ST11) as needed.

Furthermore, the Web server apparatus 2 may sell a special item required to advantageously play the game, as shown in step ST12 to be described below, as needed.

In this case, the processor 22 sells a special item based on purchase information associated in advance with the user identification information of a user by an operation of the user of the mobile terminal 3A, and stores the special item in the storage unit 21 in association with that user identification information (step ST12).

Next, for example, when the mobile terminal 3A obtains a container (for example, a box) included within the display range, the processor 22 in the Web server apparatus 2 increases the point value stored in the storage unit 21 in association with the terminal identification information of the mobile terminal 3A (step ST20).

At this time, the Web server apparatus 2 receives an instruction to open the container or that to present the container from the mobile terminal (step ST21).

When the mobile terminal 3A opens the container obtained by moving the display range or obtained as a present from the mobile terminal 3B, the processor 22 in the Web server apparatus 2 opens the container at predetermined success percentages, obtains an item from the opened container, and writes the obtained item in the storage unit 21 in association with the terminal identification information of the mobile terminal 3A (step ST30). Note that the item contained in the container is preferably not displayed until the container is opened in terms of creation of a sense of hope at the opening timing.

When the mobile terminal 3A presents the container to the user of another mobile terminal 3B without opening the processor 22 in the Web server apparatus 2 transmits screen data indicating the present of the container to the mobile terminal 3B (step ST40). Note that the processor 22 may make the container disappear when the present count of the container reaches a predetermined upper limit count.

Also, step ST40 may include following steps ST41 and ST42.

When the mobile terminal 3A presents the container to the user of another mobile terminal 3B without opening it, the processor 22 transmits present destination selection screen data including companion user identification information in the storage unit 21, which information is associated with the terminal identification information of the mobile terminal 3A, to the mobile terminal 3A (step ST41).

The processor 22 receives the companion user identification information selected from the present destination selection screen data by the mobile terminal 3A from that mobile terminal 3A, and transmits screen data indicating a present of the container to the mobile terminal 3B based on the terminal identification information of the mobile terminal 3B in the storage unit 21, which information is associated with the terminal identification information of the mobile terminal 3A (step ST42).

In place of steps ST41 and ST42, step ST40 may include a step of providing a recommend list as a list of users of present destinations recommended by the Web server apparatus 2 to the mobile terminal 3A, and prompting the user of the mobile terminal 3A to select a present destination, or a step of accepting, from the mobile terminals 3A, an automatic selection instruction which leaves the Web server apparatus 2 to select a present destination. Furthermore, step ST40 may include a step of prompting the user of the mobile terminal 3A to select one of these three types of processes (processing for selecting a present destination from companions, that of the recommend list, that of the automatic selection instruction).

If items are accumulated in step ST30, the processor 22 in the Web server apparatus 2 converts the items stored in the storage unit 21 in association with the terminal identification information of the mobile terminal 3A into Points by an operation of the user of the mobile terminal 3A, and increases the point value stored in the storage unit 21 in association with the terminal identification information by the converted points (step ST50).

According to steps ST10 to ST50 described above, in the game in which an item is obtained from a container which contains an item in advance, since the user often presents the container to a companion in addition to a case in which he or she opens the container, sociality by cooperation with companions is accomplished.

Step ST30 may include and execute a step of raising the aforementioned success percentages to 100% when a special item in the storage unit 21 is consumed by an operation of the user of the mobile terminal 3A.

Also, it is preferable to execute following steps ST60 and ST70 as needed, so as to further make the game fun.

In this case, the processor 22 composites a plurality of items stored in the storage unit 21 in association with the terminal identification information of the mobile terminal 3A by an operation of the user of the mobile terminal 3A to create a composite item, and writes the composite item in the storage unit 21 in association with the terminal identification information (step ST60).

Also, the processor 22 converts the composite item stored in the storage nit 21 in association with the terminal identification information of the mobile terminal 3A into points by an operation of the user of the mobile terminal 3A, and increases the point value stored in the storage unit 21 in association with the terminal identification information by the converted points (step ST70). After completion of step ST70, the process returns to step ST11. Note that when steps ST60 and ST70 are not executed, the process returns to step ST11 after completion of step ST50.

In the aforementioned game, for example, a personal goal (point total), goal for all companions (point total), and overall ranking goal (point total) are set for respective user layers such as light users and heavy users, thus attaching importance on sociality. To the mobile terminals 3A, 3B, . . . of users who achieved their goals or all companions, the Web server apparatus 2 can provide (transmit) an incentive (encouraging item) such as a rare item. As the incentive, for example, items such as clothes or wall papers of Clinoppe™ as a pet character kept in the mobile terminal 3A can be used as needed.

Note that steps ST11 to ST70 after step ST10 described above do not always progress in turn. The aforementioned game control method is executed while changing the execution order of steps ST11 to ST70 as needed by user operations.

Next, a practical example in which steps ST11 to ST70 are executed while changing their execution order will be described below with reference to FIGS. 16, 17, 18, 19, 20, 21, 22, 23, 24, 25, and 26 related to screen transitions.

(Practical Example: Screen Transition)

Figure 17:
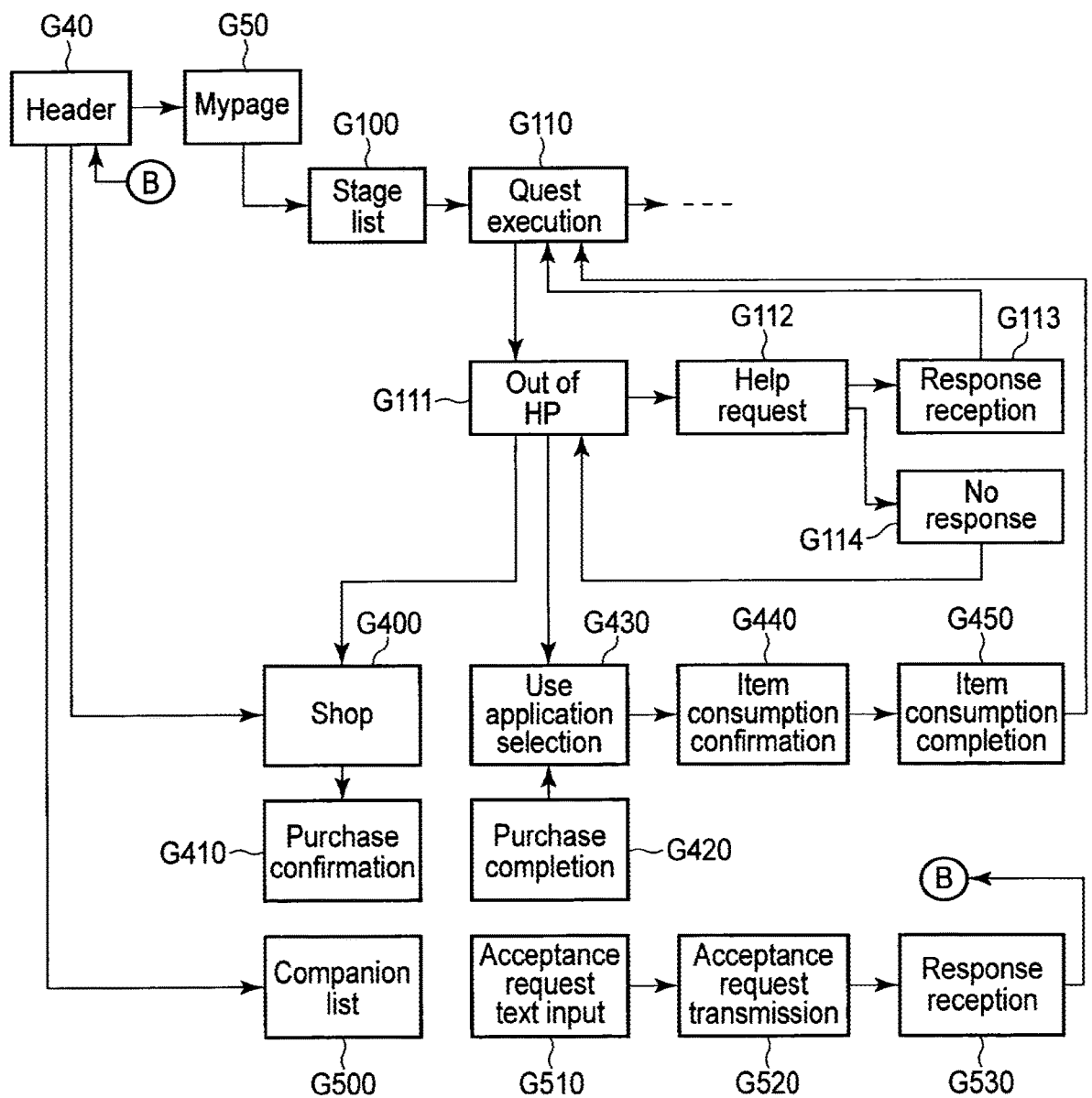
FIG. 17 is a chart showing an example of screen transitions to which the game control method according to the embodiment is applied.

FIGS. 16 and 17 show an example of screen transitions to which the game control method of this embodiment is applied. Note that the following description will be given taking the mobile terminal 3A as an example, but the same applies to another mobile terminal 3B.

A top screen G10 can individually transition to a how to play screen G20, a ranking screen G30, a header screen G40, and a mypage screen G50 by an operation of the user of the mobile terminal 3A.

The how to play screen G20 is a screen which describes fixed phrases required to explain how to play the game.

The ranking screen G30 shows, for example, a result and ranking for the personal goal (point total), those for the companion coordination goal (companion upper limit count, help responses), those for the goal of all the companions (box total count, point total), and those for the overall ranking goal (point total).

The header screen G40 can individually transition to the top screen G10, the mypage screen G50, an item list screen G200, a shop screen G400, a companion list screen 6500, and the like by an operation of the user of the mobile terminal 3A.

The mypage screen G50 displays parameters including a character name, HP value, HP upper limit value, point value, level, and the like, and can individually transition to a stage list screen G100, the item list screen G200, a conversion item selection screen G300, the ranking screen G30, and the like by an operation of the user of the mobile terminal 3A.

The stage list screen G100 is a screen related to steps ST20 to ST40 (to obtain, open, and present a container), and transitions in turn to a quest execution screen G110, a box pickup FLASH™ screen G120, and an opening/present selection screen G130 by an operation of the user of the mobile terminal 3A. Note that the quest execution screen G110 transitions to an out of HP screen G111 when an HP (stamina) value becomes zero, as shown in FIG. 17. The out of HP screen Gill transitions to a help request screen G112, the shop screen G400, or a use application selection screen G430 by an operation of the user of the mobile terminal 3A. The help request screen G112 transitions to a response reception screen G113 or no-response screen G114 in accordance with the presence/absence of a response from a companion. The response reception screen G113 returns to the quest execution screen G110. The no-response screen G114 returns to the out of HP screen G111. The opening/present selection screen G130 can individually transition to an opening success screen (in a normal state) G140, an opening success screen (when an upper limit is reached) G150, an opening failure screen G160, and a present destination selection screen 6170 by an operation of the user of the mobile terminal 3A. However, when the user selects opening of a box, success percentages transitioned to the opening success screen G140 or G150 are determined in advance. That is, even when a box is to be opened, the screen transitions to the opening failure screen G160 at failure percentages (=100%−success percentages) correlated to the success percentages. The present destination selection screen G170 transitions in turn to a message input screen G180, a present completion screen G190, and the quest execution screen G110 by an operation of the user of the mobile terminal 3A. The present completion screen G190 may transition to another screen such as the stage list screen G100 by an operation of the user of the mobile terminal 3A.

The item list screen G200 is a screen related to step ST60 (item composition), and transitions in turn to a post-material selection screen G210, composition selection screen G220, composition FLASH screen G230, and composition completion screen G240 by an operation of the user of the mobile terminal 3A. The composition completion screen G240 transitions to the conversion item selection screen G300 or the quest execution screen G110 by an operation of the user of the mobile terminal 3A.

The conversion item selection screen G300 is a screen related to steps ST50 and ST70 (point conversion), and transitions in turn to a conversion item confirmation screen G310 and a point conversion completion screen G320 by an operation of the user of the mobile terminal 3A. The point conversion completion screen G320 transitions to a double-up ticket (described as "D ticket" in FIG. 16) selection screen G330 or the quest execution screen G110 by an operation of the user of the mobile terminal 3A. The double-up ticket selection screen G330 transitions in turn to a double-up ticket completion screen G340 and the quest execution screen G110 by an operation of the user of the mobile terminal 3A.

The shop screen G400 is a screen related to step ST12 (special item sale), and transitions in turn to a purchase confirmation screen G410, a purchase completion screen G420, the use application selection screen G430, an item consumption confirmation screen G440, an item consumption completion screen G450, and the quest execution screen G110 by an operation of the user of the mobile terminal 3A.

The shop screen G400 is a screen including explanations (use applications, aims, consumption counts, and remarks) of the special item, an input field of the number of special items to be purchased, and a purchase execution button, as shown in, for example, FIG. 8.

The purchase confirmation screen G410 is a screen including, for example, a confirmation message of the purchase intension of the special item, the number of items to be purchased, and a purchase settlement button after the purchase execution button is selected.

The purchase completion screen G420 is a screen including, for example, a message indicating purchase completion of the special item after the purchase settlement button is selected. Note that the number of purchased special items is added to the special item possession count in the game status information 21c. When the special item is purchased by in-game currency, the purchase information in the user management information 21a is updated to consume the in-game currency according to the number of purchased special items.

The use application selection screen G430 is a screen including explanations (use applications, aims, consumption counts, and remarks) of the special item, use applications of the special item to be consumed, and a consumption execution button, as shown in, for example, FIG. 8.

The consumption confirmation screen G440 is a screen including, for example, a confirmation message of the consumption intension of the special item, a use application to consume the item, the number of special items to be consumed, and a consumption settlement button after the consumption execution button is selected.

The consumption completion screen G450 is a screen including, for example, a consumption completion message of the special item after the consumption settlement button is selected. Note that the number of consumed special items is subtracted from the special item possession count in the game status information 21c.

The companion list screen G500 is a screen related to step ST11 (to store companion user identification information and the like), and transitions in turn to an acceptance request text input screen 6510, an acceptance request transmission screen G520, a response reception screen G530, and the header screen G40 by an operation of the user of the mobile terminal 3A.

The companion list screen G500 is a screen which displays companion user identification information in the game status information 21c.

The acceptance request text input screen G510 is a screen including fields indicating terminal identification information and user identification information of a transmission destination of an acceptance request, an acceptance request text input field including an editable default message, and an acceptance request execution button. Note that as terminal identification information and user identification information of a transmission destination of an acceptance request, those of a present destination to which a box was presented by the automatic selection instruction can be used.

The acceptance request transmission screen 6520 is a screen indicating a transmission of the acceptance request after the acceptance request execution button is selected.

The response reception screen G530 is a screen which displays the reception contents (OK/NG of a companion acceptance response) when a response is received from the transmission destination of the acceptance request. In case of companion acceptance response is OK, the terminal identification information and the companion user identification information in the game status information 21c are updated to add the terminal identification information and the user identification information corresponding to the companion acceptance OK response.

The screen transitions shown in FIGS. 16 and 17 correspond to an example when the mypage screen G50 is used. In this case, the header screen G40 includes a mypage transition button g42 indicating transition to the mypage screen G50 in buttons g41 to g45 indicating respective transition destinations, as shown in FIG. 18.

(Modification: Screen Transition)

The mypage screen G50 is not indispensable, and may be omitted. When the mypage screen G50 is omitted, a header screen G40A obtained by modifying the header screen G40 is provided, as shown in FIG. 19. This header screen G40A can individually transition to a top screen G10A, the ranking screen G30, the stage list screen G100, the item list screen G200, the conversion item selection screen G300, the shop screen G400, the companion list screen 6500, and the like by an operation of the user of the mobile terminal 3A.

Figure 20:
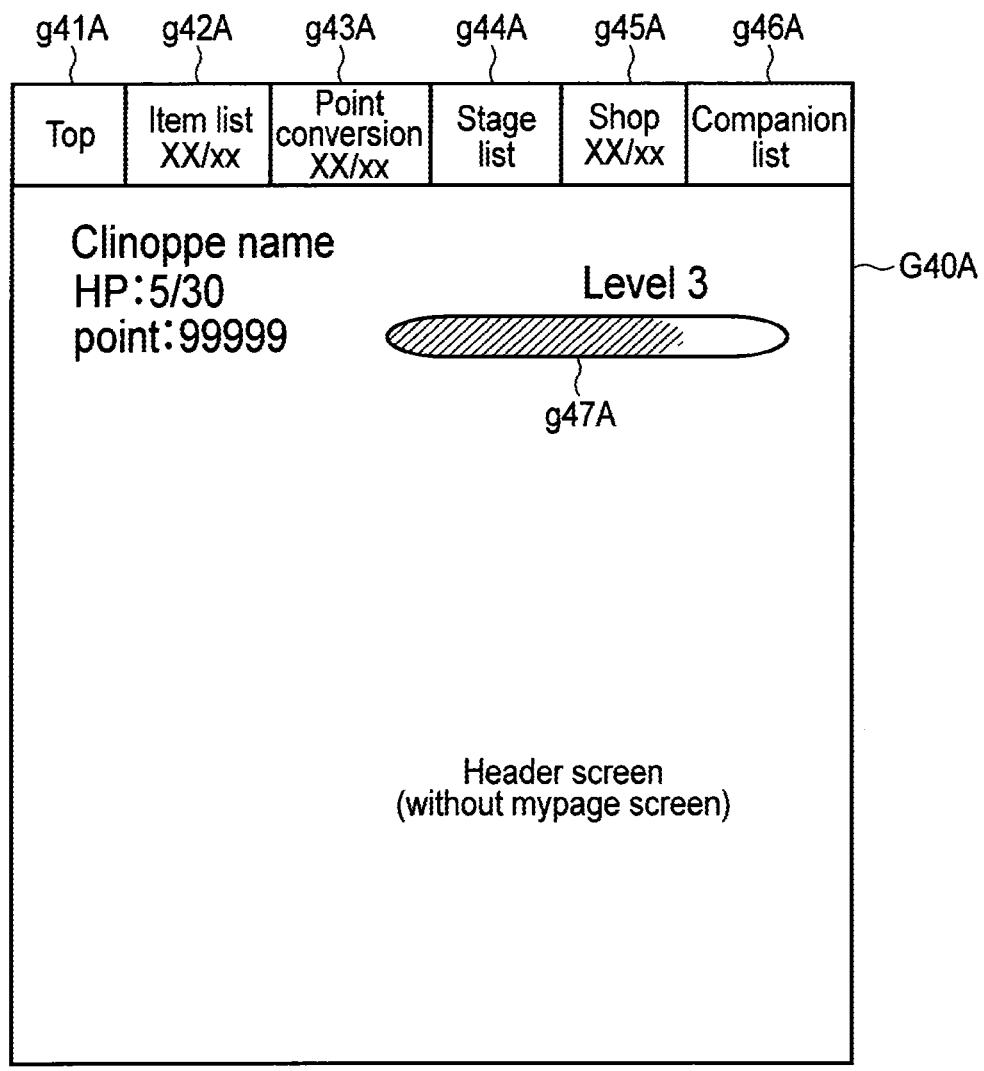
FIG. 20 is a view showing an example of a header screen according to the modification.

Accordingly, the header screen G40A does not include any mypage transition button indicating transition to the mypage screen G50 in buttons g41A to g46A indicating transition destinations, as shown in FIG. 20. The header screen G40A always displays a character name ("Clinoppe name" in FIG. 20), an HP value and HP upper limit value ("HP: 5/30" in FIG. 20), a point value ("point" in FIG. 20), a level ("level" in FIG. 20), and an experience value gauge g47A. Note that in a lower portion of the header screen G40 or G40A, buttons "home", "SHOP", "event", "dance", and "mise" related to "Clinoppe" as a pet character kept in the mobile phone 3A may be further displayed. However, these buttons on the lower portion are not directly related to the description of this embodiment.

Such screen transitions may be executed in either of a case in which the mypage screen G50 is included (FIGS. 16, 17, and 18) and that in which no mypage screen G50 is included (FIGS. 19 and 20). Note that the following description will be given taking the screen transitions including the mypage screen G50 (FIGS. 16, 17, and 18) as an example.

(Transition from Top Screen G10 to Mypage Screen G50)

Assume that during the game execution period of steps ST11 to ST70, the mobile terminal 3A displays the top screen G10 including a mypage screen transition button g11 and transition links g12 to a limited stage or the like by a user operation, as shown in, for example, FIG. 21.

The processor 22 in the Web server apparatus 2 reads out the character name, the level, point, the HP value, and the HP upper limit value from the game status information 21c in the storage unit 21 based on the terminal identification information of the mobile terminal 3A by a selection operation of the mypage transition button g11 by the user of the mobile terminal 3A.

The processor 22 generates mypage screen data required to display the mypage screen G50 including the readout contents and the buttons g51 to g54 indicating transition destinations, and transmits the mypage screen data to the mobile terminal 3A.

The mobile terminal 3A displays the mypage screen G50 based on the received mypage screen data.

(Stage Selection/Box Pickup)

Figure 22:
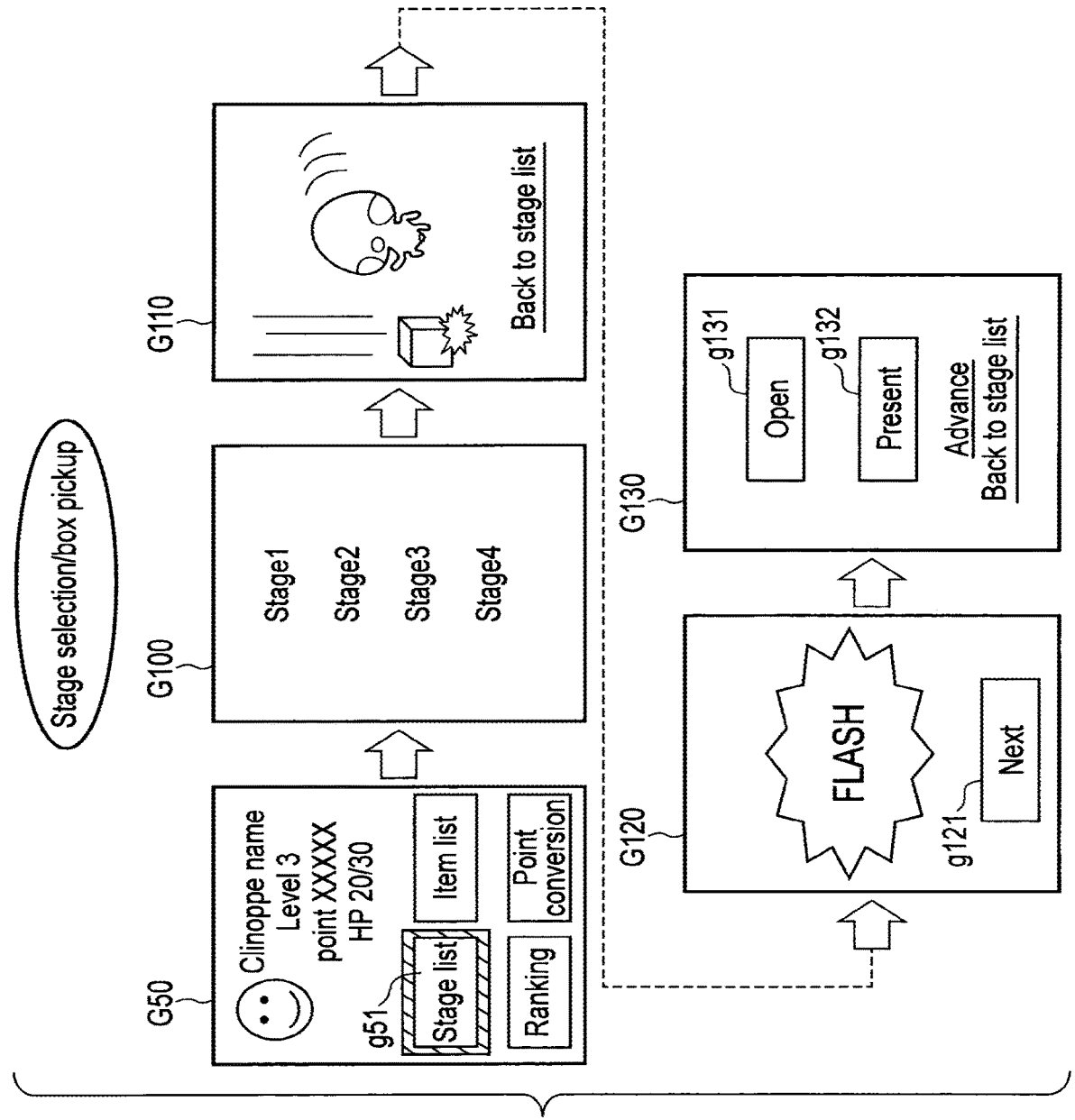
FIG. 22 is a chart showing an example of screen transitions about stage selection and box pickup according to the embodiment.

Assume that, for example, the stage list screen transition button g51 is selected by a user operation at the mobile terminal 3A during display of the mypage screen G50, as shown in FIG. 22.

The processor 22 in the Web server apparatus 2 reads out the level from the game status information 21c in the storage unit 21 based on the terminal identification information of the mobile terminal 3A in response to the selection operation of the stage list screen transition button g51.

The processor 22 generates stage list screen data required to display the stage list screen G100 including links indicating playable stages (Stages) based on the readout level, and transmits the stage list screen data to the mobile terminal 3A.

The mobile terminal 3A displays the stage list screen G100 based on the received stage list screen data.

Assume that, for example, a link "Stage 3" indicating the stage 3 is selected by a user operation at the mobile terminal 3A during display of the stage list screen G100.

The processor 22 in the Web server apparatus 2 generates quest execution screen data required to display the quest execution screen G110 for executing a quest of the stage 3 in response to the selection operation of the link "Stage 3" at the mobile terminal 3A, and transmits the quest execution screen data to the mobile terminal 3A. Note that the quest is processing corresponding to the behavior phase s1 shown in FIG. 3, and means a behavior of a character to pick up boxes dropped at given appearance percentages. Note that in the quest, an item such as a sight of a gun, glove, spoon-net, or magic hand may move in place of "character". Also, the behavior is not limited to "pickup", but an acquisition operation (including a lock-on operation (to lock a target), a catching operation using a glove, or a scooping operation using a spoon-net) according to the item need only be executed. Also, in the quest, the display range of the mobile terminal 3A is also preferably moved in terms of movement in a virtual space in cooperation with many companions independently of either the character or item to be moved.

Every time the processor 22 in the Web server apparatus 2 updates the quest execution screen data to drop a box at given appearance percentages, it updates the box management information 21d in association with box identification information of that box.

The mobile terminal 3A displays the quest execution screen 6110 based on the received quest execution screen data.

Assume that, for example, the character picks up a box by a user operation at the mobile terminal 3A during display of the quest execution screen G110. The box can be picked up by, for example, moving the character toward the box in the virtual space to reduce a distance between the character and box to be not more than a predetermined value.

The processor 22 in the Web server apparatus 2 increases the point value in the game status information 21c, which is associated with the terminal identification information of the mobile terminal 3A, in response to the box pickup operation at the mobile terminal 3A, and transmits box pickup FLASH screen data required to display the box pickup FLASH screen G120 to the mobile terminal 3A. Note that the box pickup FLASH screen G120 means a screen which displays an animation indicating pickup of the box, and a next screen transition button g121 indicating transition to the next screen.

The mobile terminal 3A displays the box pickup FLASH screen G120 based on the received box pickup FLASH screen data.

Assume that the next screen transition button g121 is selected by a user operation at the mobile terminal 3A during display of the box pickup FLASH screen G120.

The processor 22 in the Web server apparatus 2 transmits, to the mobile terminal 3A, opening/present selection screen data required to display the opening/present selection screen G130 including an opening selection button g131 and present selection button g132, in response to the selection operation of the next screen transition button g121 at the mobile terminal 3A. Note that the opening/present selection screen data may include a message indicating that the box cannot be presented at a timing immediately before the number of pieces of user identification information of present destinations in the possessing user log reaches the present upper limit count.

The mobile terminal 3A displays the opening/present selection screen G130 based on the received opening/present selection screen data.

(Selection After Opening)

Assume that the opening selection button g131 is selected by a user operation at the mobile terminal 3A during display of the opening/present selection screen G130.

When the container is opened by the selection operation of the opening selection button g131 at the mobile terminal 3A, the processor 22 in the Web server apparatus 2 opens the container at predetermined success percentages, obtains an item from the opened container, and writes the obtained item in the game status information 21c in association with the terminal identification information of the mobile terminal 3A. Also, the processor 22 updates the box management information 21d to set the box disappearance flag based on box identification information of that box.

Furthermore, the processor 22 reads out the possessed items and item possession count upper limit from the game status information 21c in the storage unit 21 based on the terminal identification information of the mobile terminal 3A.

The processor 22 determines whether or not the number of readout possessed items reaches the item possession count upper limit. If this determination result is NO, the processor 22 transmits, to the mobile terminal 3A, opening success screen data required to display the opening success screen G140 including a composition button g141, a point conversion button g142, and an item list advance link "advance" g143, as shown at (a) in FIG. 23. Also, as a result of determination, when the item possession count upper limit is reached, the processor 22 transmits, to the mobile terminal 3A, opening success screen data required to display the opening success screen 6150 including a composition button g151, a point conversion button g152, and an extension button g153, as shown at (b) in FIG. 23. Note that the extension button g153 is used to transition to an extension screen (not shown) which transitions to the shop screen G400 required to purchase the special item from a shop or the use application selection screen G430 required to consume the possessed special items by an operation of the user of the mobile terminal 3A.

In either case, the mobile terminal 3A displays the opening success screen G140 or G150 based on the received opening success screen data, and the screen transitions according to a button or a link selected by a user operation.

Figure 23:
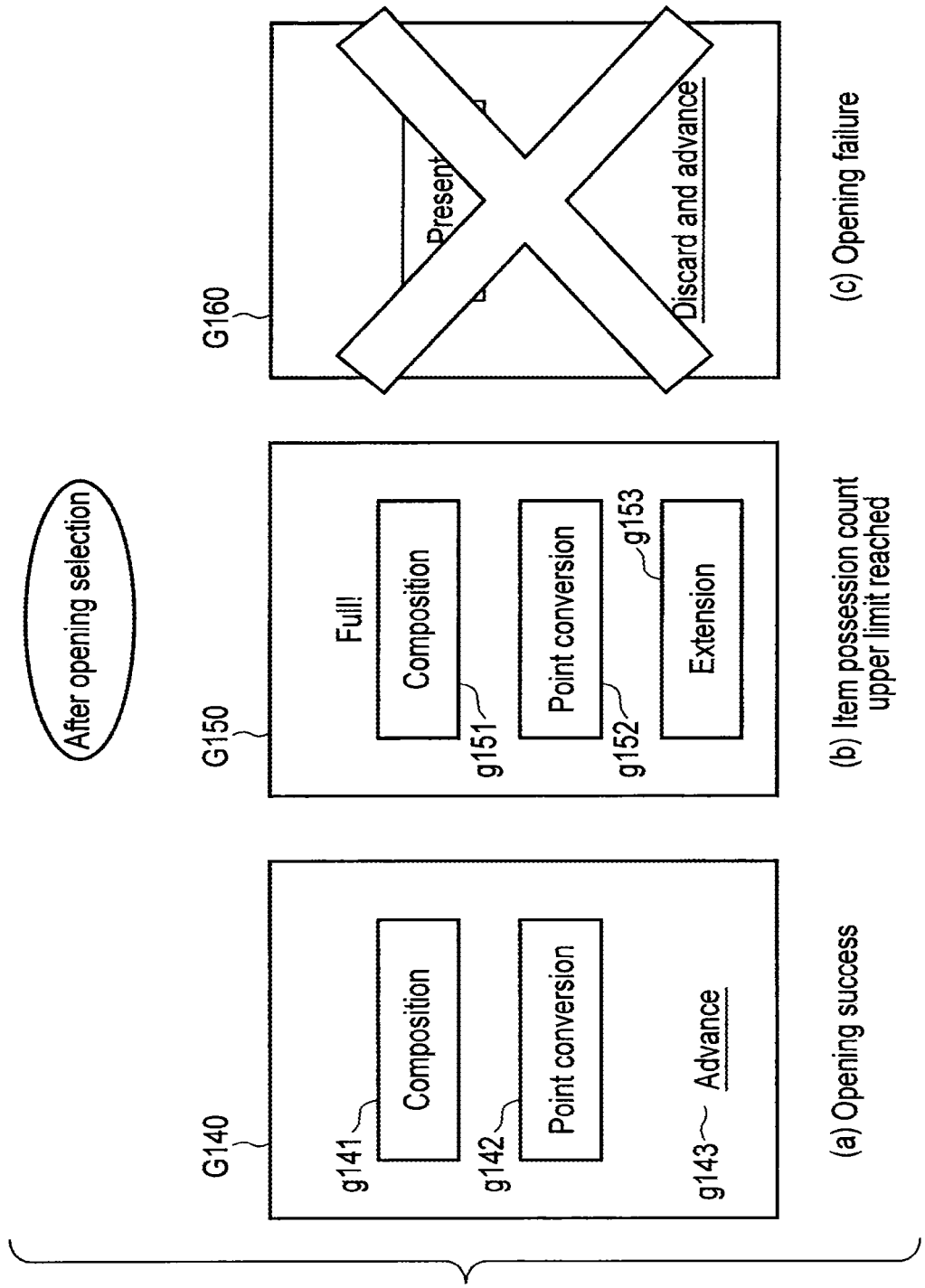
FIG. 23 is a view showing an example of screens after open selection according to the embodiment.

When the box has failed to be opened, the processor 22 in the Web server apparatus 2 transmits opening failure screen data required to display the opening failure screen G160 indicating opening failure to the mobile terminal 3A, as shown at (c) in FIG. 23. The mobile terminal 3A displays the opening failure screen G160 based on the received opening failure screen data.

After transmission of the opening failure screen data, the processor 22 in the Web server apparatus 2 reads out companion user identification information from the game status information 21c in the storage unit 21 based on the terminal identification information of the mobile terminal 3A.

The processor 22 generates present destination selection screen data required to display the present destination selection screen G170 including an automatic selection instruction button g171, companion selection links g172 based on the readout companion user identification information, and a box discard link g173, as shown in FIG. 24, and transmits the present destination selection screen data to the mobile terminal 3A.

Note that the Web server apparatus 2 similarly transmits the present destination selection screen data to the mobile terminal 3A even by a selection operation of the present selection button g132 in the opening/present selection screen G130 at the mobile terminal 3A.

(After Present Selection)

The mobile terminal 3A displays the present destination selection screen G170 shown in FIG. 24 based on the received present destination selection screen data.

Assume that the companion selection link g172 indicating, for example, a companion U2 is selected by a user operation at the mobile terminal 3A during display of the present destination selection screen G170.

The processor 22 in the Web server apparatus 2 reads out terminal identification information of a companion user from the game status information 21c in the storage unit 21 based on the terminal identification information of the mobile terminal 3A and the companion selection link g172 in response to the selection operation of the companion selection link g172 at the mobile terminal 3A.

The processor 22 generates message input screen data required to display the message input screen G180 including a fixed phrase "present to companion U2" based on the companion selection link g172, a message input field g181 including an editable default message, and a present execution button g182, and transmits the message input screen data to the mobile terminal 3A.

The mobile terminal 3A displays the message input screen G180 based on the received message input screen data, and edits a message in the message input field g181 by a user operation. After that, the mobile terminal 3A selects the present execution button g182 by a user operation.

The processor 22 in the Web server apparatus 2 reads out the terminal identification information of the companion user from the game status information 21c based on, for example, user identification information "U2" of the companion user referred in the fixed phrase "present to companion U2" and the terminal identification information of the mobile terminal 3A in response to the selection operation at the mobile terminal 3A.

The processor 22 in the Web server apparatus 2 transmits the box and the edited message in the message input field g181 to the mobile terminal 3B of the companion U2 based on the readout terminal identification information of the companion U2. Also, the processor 22 updates the box management information 21d based on box identification information of the box to add U2 to the possessing user log. Note that the processor 22 makes the box disappear when the number of pieces of user identification information of the present destinations in the possessing user log reaches the present upper limit count.

After that, the processor 22 in the Web server apparatus 2 transmits, to the mobile terminal 3A, present completion screen data required to display the present completion screen G190 including a transition button g191 used to transition to the quest execution screen G110, and a link g192 used to return to the stage list.

The mobile terminal 3A displays the present completion screen G190 based on the received present completion screen data, and the screen transitions according to the transition button g191 or link g192 selected by a user operation.

(Composition)

Figure 25:
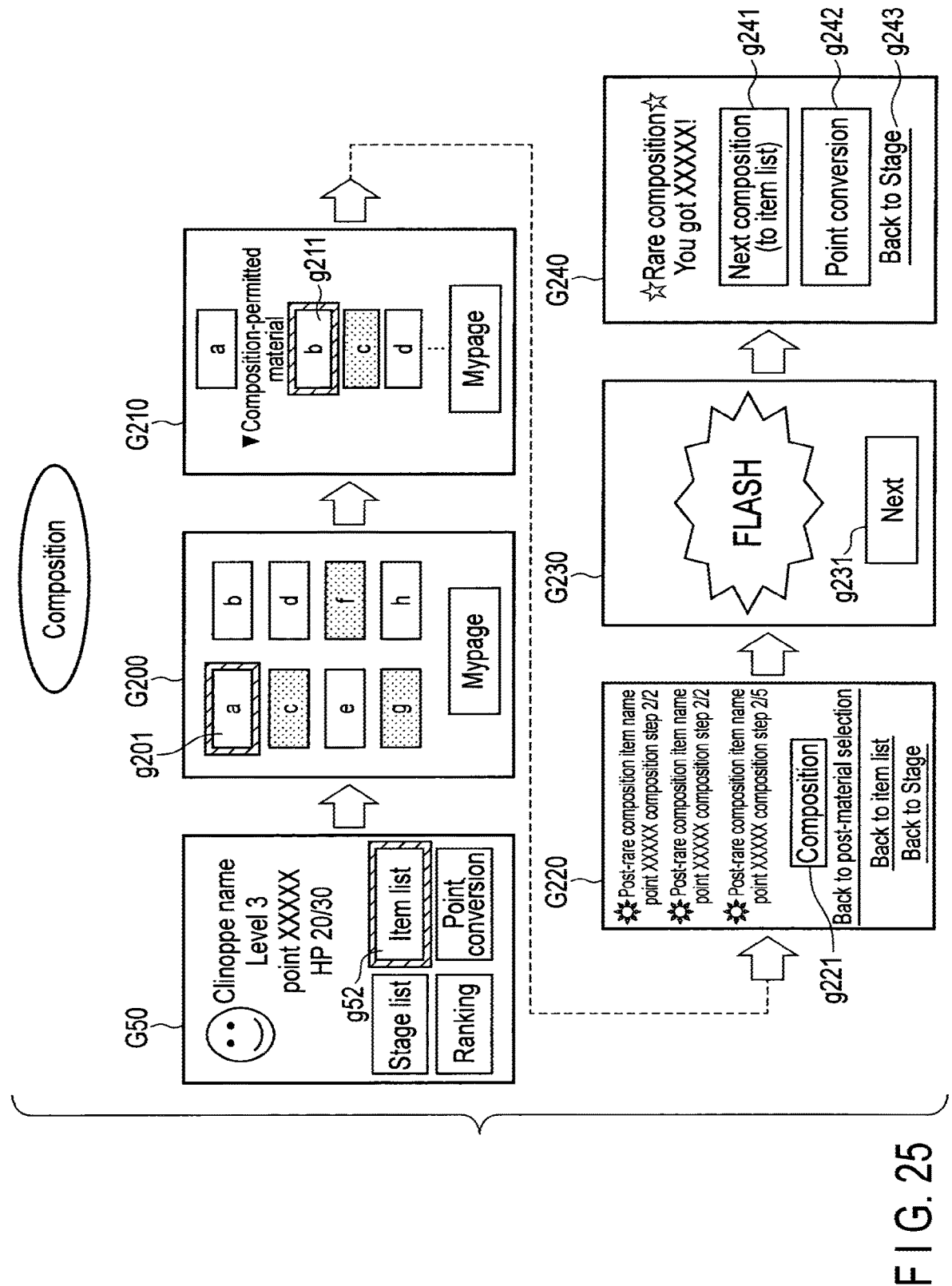
FIG. 25 is a view showing an example of screen transitions at the time of composition according to the embodiment.

Assume that, for example, the item list screen transition button g52 is selected by a user operation at the mobile terminal 3A during display of the mypage screen G50, as shown in FIG. 25.

The processor 22 in the Web server apparatus 2 reads out possessed items "a", "b", "d", "e", and "h" from the game status information 21c in the storage unit 21 based on the terminal identification information of the mobile terminal 3A in response to the selection operation of the item list screen transition button g52 at the mobile terminal 3A.

The processor 22 generates item list screen data required to display the item list screen G200 including selection buttons g201 indicating the readout possessed items "a", "b", "d", "e", and "h", and transmits the item list screen data to the mobile terminal 3A. Note that the item list screen G200 shown in FIG. 25 also pales out non-possessed items "c", "f", and "g". However, the present invention is not limited to this, and the display of non-possessed may be omitted. The same applies to the next post-material selection screen G210.

The mobile terminal 3A displays the item list screen G200 based on the received item list screen data.

Assume that the selection button g201 indicating, for example, a material (item) "a" is selected by a user operation at the mobile terminal 3A during display of the item list screen G200.

The processor 22 in the Web server apparatus 2 generates post-material selection screen data required to display the post-material selection screen G210 including selection buttons g211 indicating possessed items "b", "d", . . . which can be composited to the material "a" in response to the selection operation of the selection button g201 at the mobile terminal 3A, and transmits the post-material selection screen data to the mobile terminal 3A.

The mobile terminal 3A displays the post-material selection screen G210 based on the received post-material selection screen data.

Assume that the selection button g211 indicating, for example, a material (item) "b" is selected by a user operation at the mobile terminal 3A during display of the post-material selection screen G210.

The processor 22 in the Web server apparatus 2 generates composition selection screen data required to display the composition selection screen G210 including post-composition item names each indicating a composite item based on the materials "a" and "b", converted points, and a composition execution button g221 in response to the selection operation of the selection button g211 at the mobile terminal 3A, and transmits the composition selection screen data to the mobile terminal 3A. Note that the composition selection screen G220 shown in FIG. 25 displays composition phases "2/2" and "2/5", but a composition phase may be omitted when a composite item is completed by compositing two materials (in case of "2/2").

Assume that, for example, the first post-composition item name and the composition execution button g221 are selected by a user operation at the mobile terminal 3A during display of the composition selection screen G220.

The processor 22 in the Web server apparatus 2 updates the possessed items stored in the game status information 21c in association with the terminal identification information of the mobile terminal 3A in response to the selection operation at the mobile terminal 3A, and transmits composition FLASH screen data required to display the composition FLASH screen G230 to the mobile terminal 3A. The possessed items are updated, so that the possessed items "a" and "b" (materials) are changed to a possessed item "ab" (composite item). Note that the composition FLASH screen G230 means a screen which displays an animation indicating composition of materials, and a next screen transition button g231 indicating transition to the next screen.

The mobile terminal 3A displays the composition FLASH screen G230 based on the received composition FLASH screen data.

Assume that the next screen transition button g231 is selected by a user operation at the mobile terminal 3A during display of the composition FLASH screen G230.

The processor 22 in the Web server apparatus 2 transmits, to the mobile terminal 3A, composition completion screen data required to display the composition completion screen G240 including a composition continuation transition button g241 used to return to the item list screen G200, a point conversion transition button g242 used to transition to the conversion item selection screen G300, and a quest execution screen transition button g243 in response to the selection operation of the next screen transition button g231 at the mobile terminal 3A.

The mobile terminal 3A displays the composition completion screen G240 based on the received composition completion screen data, and the screen transitions according to the transition button g241, g242, or g243 selected by a user operation.

(Point Conversion)

Figure 26:
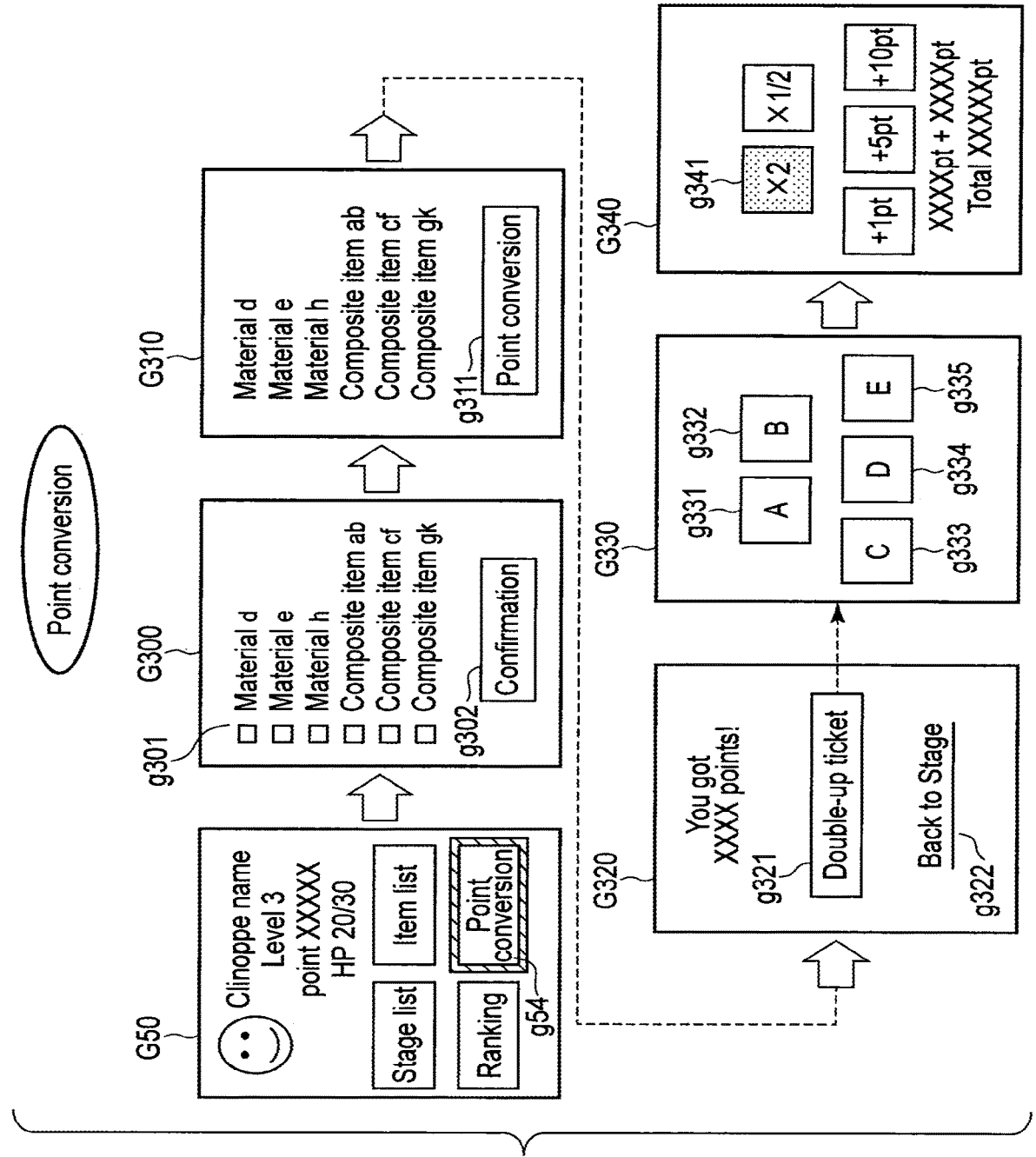
FIG. 26 is a view showing an example of screen transitions at the time of point conversion according to the embodiment.

Assume that, for example, the conversion item selection screen transition button g54 is selected by a user operation at the mobile terminal 3A during display of the mypage screen G50, as shown in FIG. 26.

The processor 22 in the Web server apparatus 2 reads out possessed items "d", "e", "h", "ab", "cf", and "gk" from the game status information 21c in the storage unit 21 based on the terminal identification information of the mobile terminal 3A in response to the selection operation of the conversion item selection screen transition button g54 at the mobile terminal 3A. Note that the possessed items "d", "e", and "h" are materials, and the items "ab", "cf", and "gk" are composite items.

The processor 22 generates conversion item selection screen data required to display the conversion item selection screen G300 including check boxes g301 indicating the readout possessed items "d", "e", "h", "ab", "cf", and "gk", and a confirmation button g302, and transmits the conversion item selection screen data to the mobile terminal 3A.

The mobile terminal 3A displays the conversion item selection screen G300 based on the received conversion item selection screen data.

Assume that the check boxes g301 of, for example, all the possessed items and the confirmation button g302 are selected by a user operation at the mobile terminal 3A during display of the conversion item selection screen G300.

The processor 22 in the Web server apparatus 2 generates conversion item confirmation screen data required to display the conversion item confirmation screen G310 including the possessed items "d", "e", "h", "ab", "cf", and "gk" of the selected check boxes g301 and a point conversion execution button g311 in response to the selection operation of the confirmation button g302 at the mobile terminal 3A, and transmits the conversion item confirmation screen data to the mobile terminal 3A.

The mobile terminal 3A displays the conversion item confirmation screen G310 based on the received conversion item confirmation screen data.

Assume that the point conversion execution button g311 is selected by a user operation at the mobile terminal 3A during display of the conversion item confirmation screen G310.

The processor 22 in the Web server apparatus 2 converts the possessed items "d", "e", "h", "ab", "cf", and "gk" into points in response to the selection operation at the mobile terminal 3A.

After that, the processor 22 in the Web server apparatus 2 transmits, to the mobile terminal 3A, point conversion completion screen data required to display the point conversion completion screen G320 including a fixed phrase "You got xxxx points!" including the point value obtained by the point conversion, a double-up ticket screen transition button g321, and a quest execution screen transition button 322.

The mobile terminal 3A displays the point conversion completion screen G320 based on the received point conversion completion screen data.

Assume that the quest execution screen transition button g322 is selected by a user operation at the mobile terminal 3A during display of the point conversion completion screen G320.

The processor 22 in the Web server apparatus 2 updates the point value stored in the game status information 21c in association with the terminal identification information of the mobile terminal 3A so as to add the point value obtained by the point conversion in response to the selection operation at the mobile terminal 3A, and transmits the quest execution screen data to the mobile terminal 3A. Then, the mobile terminal 3A displays the quest execution screen 6110.

On the other hand, assume that the double-up ticket screen transition button g321 is selected by a user operation at the mobile terminal 3A during display of the point conversion completion screen G320.

The processor 22 in the Web server apparatus 2 transmits, to the mobile terminal 3A, D-ticket selection screen data required to display the D-ticket selection screen G330 including, for example, D-ticket selection buttons g331 to g335 individually indicating reverse faces "A" to "E" of five double-up tickets in response to the selection operation at the mobile terminal 3A.

The mobile terminal 3A displays the D-ticket selection screen G330 based on the received D-ticket selection screen data.

Assume that the D-ticket selection button g331 of the reverse face "A" selected by a user operation at the mobile terminal 3A during display of the D-ticket selection screen G330.

The processor 22 in the Web server apparatus 2 calculates a point value to be added based on the point value obtained by the point conversion and a ratio "×2" of a selected double-up ticket g341 in response to the selection operation at the mobile terminal 3A, and updates the point value stored in the game status information 21c in association with the terminal identification information of the mobile terminal 3A so as to add the calculated point value.

After that, the processor 22 in the Web server apparatus 2 transmits, to the mobile terminal 3A, D-ticket completion screen data required to display the D-ticket completion screen G340 including a fixed phrase "xxxx pt+xxxx pt=xxxxx pt" including the point value before update, the point value to be added, and the updated point value, the ratio "×2" of the selected double-up ticket g341, and values "×½", "+1 pt", "+5 pt", and "+10 pt" of the remaining double-up tickets. Note that the ratio "×2" of the selected double-up ticket g341 and the remaining values "×½", "+1 pt", "+5 pt", and "+10 pt" are preferably displayed in different manner by using, for example, different colors.

The mobile terminal 3A displays the D-ticket completion screen G340 based on the received D-ticket completion screen data.

After that, the processor 22 in the Web server apparatus 2 transmits the quest execution screen data to the mobile terminal 3A and make the mobile terminal 3A display the quest execution screen G110.

Thus, the mobile terminal 3A displays the quest execution screen G110, and continues to play the game.

As described above, according to this embodiment, in the game in which an item is obtained from a container which contains an item in advance, since the user is able to present that container to a companion in some cases in addition to opening it, the joy of presents between the users can be attained, and sociality by cooperation with companions can be accomplished.

Also, according to this embodiment, when the present count of the container reaches the predetermined upper limit count, since that container disappears, a game delay caused by endlessly presenting the container can be prevented.

Furthermore, since the number of companions can be increased by a companion acceptance request and acceptance response, sociality by cooperation with companions can be further accomplished.

Moreover, according to this embodiment, since the success percentages of opening can be raised to 100% by consuming the special item, the user can open the container at the success percentages of 100% if he or she wants to open that container anyway.

In addition, according to this embodiment, since an item contained in the container is not displayed until the container is opened, the user can get the thrill of opening the container, contents of which are unknown.

Also, according to this embodiment, since a composite item is generated by compositing a plurality of items (materials), the user can get the joy of creating something from materials.

Note that the method described in the embodiment can be distributed as a program which can be executed by a computer while being stored in a computer-readable storage medium such as a magnetic disk (Floppy™ disk, hard disk, or the like), optical disk (CD-ROM, DVD, or the like), magnetooptical disk (MO), or semiconductor memory.

Note that the present invention is not limited to the embodiment intact. The present invention can be embodied by modifying components without departing from the scope of the invention when it is practiced. Also, various inventions can be formed by appropriately combining a plurality of components disclosed in the embodiment. For example, some components may be deleted from all components described in the embodiment. Furthermore, components of different embodiments may be combined as needed.

What is claimed is:

1. A game control method, comprising:
controlling, by circuitry of a server, a plurality of mobile terminals to individually execute a game, the game including a container that contains an item, the container being obtained by one of moving a display range for each mobile terminal in a virtual space based on a user operation of a first mobile terminal or a second mobile terminal;
controlling the circuitry of the server to transmit to the first mobile terminal, when the container is not opened and is provided as a present to the first mobile terminal, present destination selection screen data including user identification information corresponding to at least one user other than a user of the first mobile terminal and user identification information of the user of the first mobile terminal;
controlling the circuitry of the server to receive, from the first mobile terminal, selection of user identification information of a user, other than the user of the first mobile terminal, selected from the present destination selection screen data; and
controlling the circuitry of the server to transmit, to the second mobile terminal corresponding to the selected user identification information, screen data indicating presentation of the container based on the selected user identification information and the user identification information of the user of the first mobile terminal.

2. The game control method according to claim 1, further comprising:
determining, by the circuitry of the server, whether the container is opened by a user of the second mobile terminal; and
in response to determining that the container is opened, causing, by circuitry of the server, the second mobile terminal to obtain points corresponding to the item in the container.

3. The game control method according to claim 1, further comprising:
determining, by the circuitry of the server, whether the container is opened by a user of the second mobile terminal;
in response to determining that the container is opened, determining, by the circuitry of the server, whether a number of items stored by the second mobile terminal is equal to or greater than a predetermined limit; and
causing, by the circuitry of the server, the second mobile terminal to store the item when the number of items stored by the second mobile terminal is below the predetermined limit.

4. The game control method according to claim 3, further comprising:
transmitting, by the circuitry of the server, screen data to the second mobile terminal to cause the second mobile terminal to display a control for consuming the item or an item stored in by the second mobile terminal.

5. The game control method according to claim 2, further comprising:
transmitting, by the circuitry of the server, opening failure screen data to the second terminal indicating a failure to open the container when the circuitry of the server determines that the user fails to open the container.

6. The game control method according to claim 5, wherein the opening failure screen data includes an operation object to present the container to another mobile terminal and an operation object to discard the container.

7. The game control method according to claim 6, wherein the opening failure screen data includes user companion information corresponding to other users that are identified as companions to the user of the second mobile terminal in the game.

8. The game control method according to claim 7, wherein a number of companions of the user of the second terminal is limited by a set limit.

9. The game control method according to claim 8, wherein the set limit is increased based on a number of containers presented to other mobile terminals.

10. The game control method according to claim 1, wherein the first mobile terminal receives in-game currency in exchange for presenting the container to the second mobile terminal.

11. The game control method according to claim 1, wherein the first mobile terminal receives in-game currency when a predetermined condition is satisfied.

12. The game control method according to claim 11, wherein the predetermined condition is an increase in the game level of the user of the first mobile terminal.

13. A server that controls a game, comprising:
circuitry configured to:
control a plurality of mobile terminals to individually execute the game, the game including a container that contains an item, the container being obtained by one of moving a display range for each mobile terminal in a virtual space based on a user operation of a first mobile terminal or a second mobile terminal,
transmit to the mobile terminal, when the container is not opened and is provided as a present to the first mobile terminal, present destination selection screen data including user identification information corresponding to at least one user other than a user of the first mobile terminal and user identification information of the user of the first mobile terminal,
receive, from the first mobile terminal, selection of user identification information of a user, other than the user of the first mobile terminal, selected from the present destination selection screen data, and transmit, to the second mobile terminal corresponding to the selected user identification information, screen data indicating presentation of the container based on the selected user identification information and the user identification information of the user of the first mobile terminal.

14. A non-transitory computer-readable medium encoded with computer-readable instructions that, when executed by processing circuitry, causes the processing circuitry to perform a game control method comprising:

controlling a plurality of mobile terminals to individually execute a game, the game including a container that contains an item, the container being obtained by one of moving a display range for each mobile terminal in a virtual space based on a user operation of a first mobile terminal or a second mobile terminal;

transmitting to the mobile terminal, when the container is not opened and is provided as a present to the first mobile terminal, present destination selection screen data including user identification information corresponding to at least one user other than a user of the first mobile terminal and user identification information of the user of the first mobile terminal;

receiving, from the first mobile terminal, selection of user identification information of a user, other than the user of the first mobile terminal, selected from the present destination selection screen data; and transmitting, to the second mobile terminal corresponding to the selected user identification information, screen data indicating presentation of the container based on the selected user identification information and the user identification information of the user of the first mobile terminal.

* * * * *